United States Patent
Chu

(10) Patent No.: US 7,039,622 B2
(45) Date of Patent: May 2, 2006

(54) COMPUTER-IMPLEMENTED KNOWLEDGE REPOSITORY INTERFACE SYSTEM AND METHOD

(75) Inventor: Chengwen Robert Chu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 509 days.

(21) Appl. No.: 09/954,278

(22) Filed: Sep. 12, 2001

(65) Prior Publication Data

US 2003/0065663 A1 Apr. 3, 2003

(51) Int. Cl.
G06F 17/00 (2006.01)
G06N 5/02 (2006.01)

(52) U.S. Cl. .................. 706/46; 706/14; 706/12; 706/47

(58) Field of Classification Search .............. 706/46, 706/14, 12, 47
See application file for complete search history.

(56) References Cited

U.S. PATENT DOCUMENTS

| | | | |
|---|---|---|---|
| 5,021,992 A | 6/1991 | Kondo | |
| 5,101,374 A | 3/1992 | Sinutko, Jr. | |
| 5,257,185 A | 10/1993 | Farley et al. | |
| 5,377,308 A | 12/1994 | Inoue et al. | |
| 5,579,441 A | 11/1996 | Bezek et al. | |
| 5,649,190 A | 7/1997 | Sharif-Askary et al. | |
| 5,682,539 A | 10/1997 | Conrad et al. | |
| 5,692,107 A | 11/1997 | Simoudis et al. | |
| 5,832,450 A | 11/1998 | Myers et al. | |
| 5,838,907 A | 11/1998 | Hansen | |
| 5,842,197 A | 11/1998 | Ho | |
| 5,845,278 A | 12/1998 | Kirsch et al. | |
| 5,911,074 A * | 6/1999 | Leprince et al. | ............ 717/100 |
| 5,978,811 A | 11/1999 | Smiley | |
| 6,003,039 A | 12/1999 | Barry et al. | |
| 6,078,918 A | 6/2000 | Allen et al. | |
| 6,102,958 A | 8/2000 | Meystel et al. | |
| 6,167,405 A | 12/2000 | Rosensteel, Jr. et al. | |
| 6,182,079 B1 | 1/2001 | Lenzie | |
| 6,189,005 B1 | 2/2001 | Chakrabarti et al. | |
| 6,202,159 B1 | 3/2001 | Ghafir et al. | |
| 6,236,978 B1 | 5/2001 | Tuzhilin | |
| 6,240,411 B1 * | 5/2001 | Thearling | ............... 707/5 |
| 6,263,337 B1 | 7/2001 | Fayyad et al. | |
| 6,263,341 B1 | 7/2001 | Smiley | |
| 6,327,698 B1 | 12/2001 | Kolluru | |
| 6,349,306 B1 | 2/2002 | Malik et al. | |
| 6,374,252 B1 | 4/2002 | Althoff et al. | |

(Continued)

FOREIGN PATENT DOCUMENTS

WO 9913427 3/1999

(Continued)

OTHER PUBLICATIONS

U.S. Appl. No. 09/668,077, filed Sep. 22, 2000.

(Continued)

*Primary Examiner*—Joseph P. Hirl
(74) *Attorney, Agent, or Firm*—Jones Day

(57) ABSTRACT

A computer-implemented knowledge repository data interface system and method for use by client applications to interact with a plurality of knowledge repositories. The knowledge repositories contain analytical models of interest to the client applications. A request handling module receives requests regarding the models from one of the client applications over a network. Knowledge repository application programming interfaces (APIs) are used to retrieve data about the models in the knowledge repositories based upon the received requests.

35 Claims, 20 Drawing Sheets

U.S. PATENT DOCUMENTS

| | | | |
|---|---|---|---|
| 6,381,605 | B1 | 4/2002 | Kothuri et al. |
| 6,405,366 | B1 * | 6/2002 | Lorenz et al. .............. 717/107 |
| 6,411,961 | B1 | 6/2002 | Chen |
| 6,449,612 | B1 | 9/2002 | Bradley et al. |
| 6,470,333 | B1 | 10/2002 | Baclawski |
| 6,473,758 | B1 | 10/2002 | Schwartz et al. |
| 6,782,391 | B1 | 8/2004 | Scher |
| 2003/0004912 | A1 * | 1/2003 | Pant et al. .................... 706/47 |
| 2004/0215599 | A1 | 10/2004 | Apps et al. |

FOREIGN PATENT DOCUMENTS

| | | |
|---|---|---|
| WO | 0133464 | 5/2001 |
| WO | 0 3005232 | 1/2003 |

OTHER PUBLICATIONS

Saharia, Aditya N. et al., "Enhancing Data Warehouse Performance through Query Caching," The DATA BASE for Advances in Information Systems, vol. 31, No. 3 (2000).

Press Release, "SPSS Unveils Aggressive Development Plans—1999 product releases will focus on scalability and deployment solutions for the enterprise", Feb. 18, 1999 (4 pp.).

Press Release, "Department of Health and Human Services to provide employees with SPSS data analysis software—SPSS influence increases as it lands another large government deal", Apr. 13, 1999 (2 pp).

Press Release, "SPSS ships data mining and data analysis software for AS/400 users—Data preparation, report OLAP and advanced statistics complement IBM's Intelligent Miner", Jun. 30, 1999, (3 pp.).

Press Release, "SPSS Inc. delivers enterprise-strength data mining—Two new products give users dramatically improved performance with large data sets", Sep. 30, 1999, (3 pp.).

Press Release, "SPSS introduces market research Web reporting solutions—New tools for automatic, real-time analysis and online reporting available now", Feb. 7, 2000 (2 pp.).

Press Release, "SPSS ships SmartViewer Web Server 2.0—Software enables enterprise-wide distribution of and interaction with SPSS analytical reports", Sep. 11, 2000, (3 pp.).

* cited by examiner

![Model Navigator screenshot]

Model Navigator Model Search > New Search

- DATATYPE        customer
- PROJECTDEPT     Marketing
- BESTINGROUP     No
- NUMSTARS        3.5
- WHO             Jon Trexler

242

Fit Statistics:

| Name   | Description                 | Value       |
|--------|-----------------------------|-------------|
| _NW_   | Number of Estimates Weights | 8           |
| _MISC_ | Misclassification Rate      | .3855544025 |
| _RASE_ | Root Average Squared Error  | .4779138968 |
| _ASE_  | Average Squared Error       | .2284016927 |

240

Notes:

Other Detailed Information about the Model:

- Model Report from Enterprise Miner
- Training Root Table/Training Vars
- SAS Score Code Process
- C Score Code Process

Model Navigator - Microsoft Internet Explorer

File Edit View Favorites Tools Help

Back Forward Stop Refresh Home Search Favorites History Mail Print Edit Discuss RealGuide Links | Address | http://localhost:8080/modelnav/groups1.jsp

Model Navigator Model Search > Campaign Management                                                                §sas.

Home    Model Search    Model Groups    Summary    Wish List                                        Account  Help  Log On Campaign Management Fraud Detection Web Analysis

252

Campaign Management Model Group

| Target | Date | Segment | Algorithm | Model Rating | Modeler | Details | Select |
|---|---|---|---|---|---|---|---|
| Online Purchase | March 28, 2000 | Female, Single, College | Tree | ★★★★ | tokels | Details | ☐ |
| Online Purchase | February 29, 2000 | Male, High Income, No Kids | Regression | ★★★ | sasrcc | Details | ☐ |
| Online Purchase | March 15, 2000 | Female, Single, College | Neural | ★★★★ | tokels | Details | ☐ |
| Online Purchase | February 15, 2000 | Male, Top %5 Profitable Customers | Tree | ★★ | tokels | Details | ☐ |

Single - Model View:   Sibling Models   Historical Models   Diagnostic Chart

Single or Multiple - Model View:   Lift Chart   ROC Chart   Trees   InputVariable Ranks Is the selected model obsolete?  Evaluate    Data set to be scored: ____

Model Group:   Remove Selected Models    Clear   Replicate

Rename Current Group: ____

Done                                                                                     Local intranet

Fig. 13

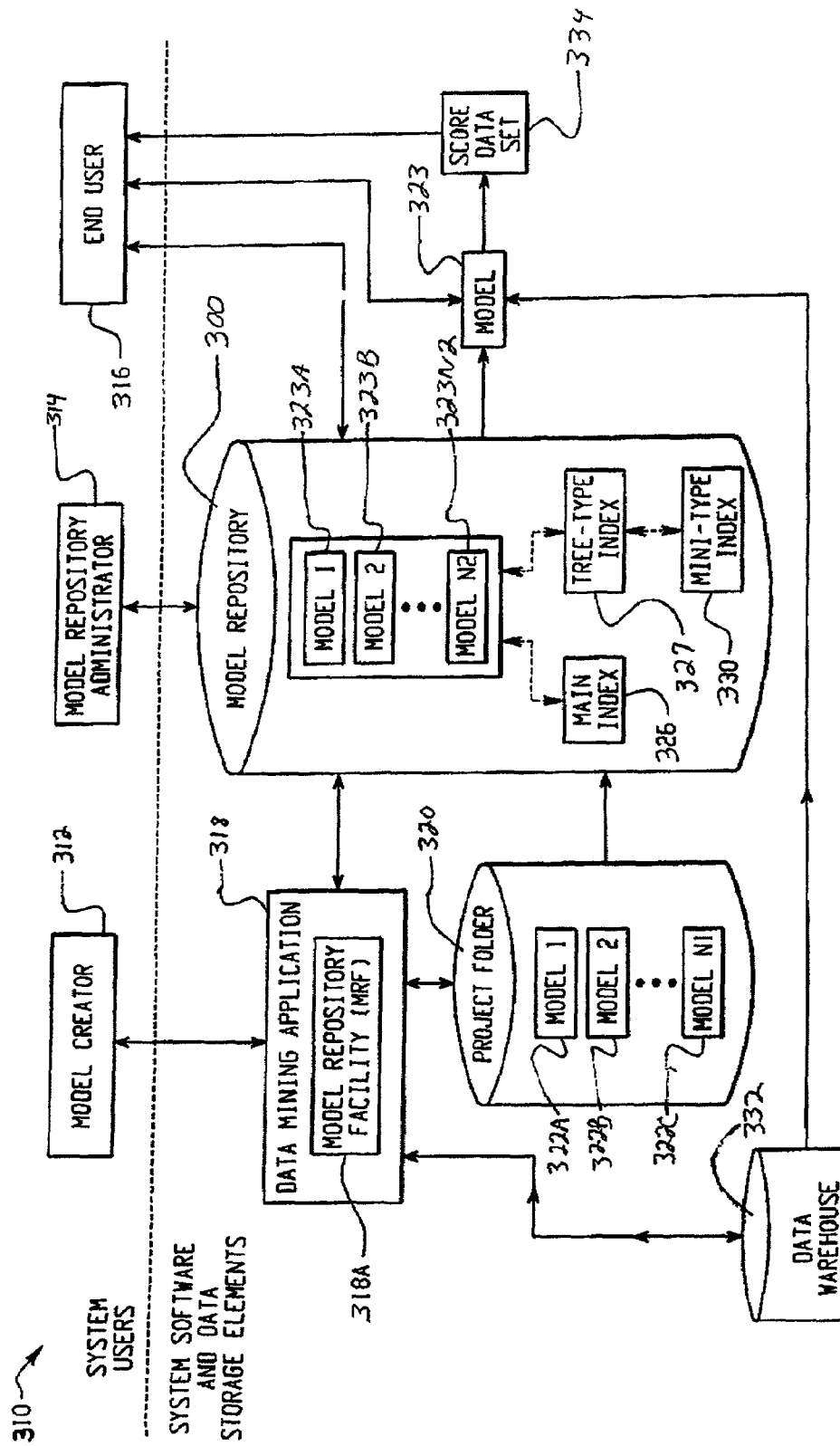

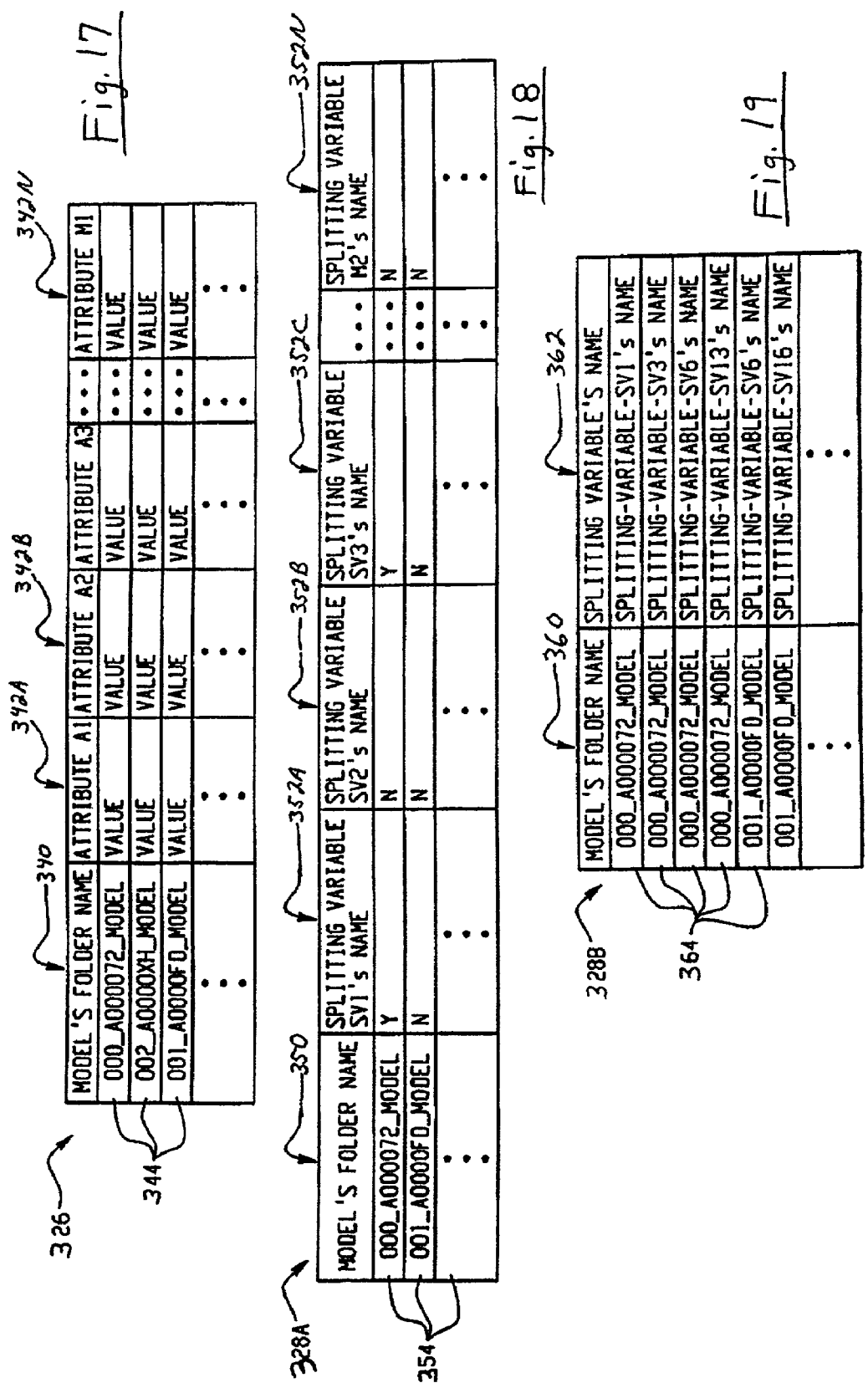

COMPUTER-IMPLEMENTED KNOWLEDGE REPOSITORY INTERFACE SYSTEM AND METHOD

BACKGROUND AND SUMMARY

The present invention is directed to the field of computer-implemented knowledge repositories. More specifically, the present invention is directed to computer-implemented interfaces to knowledge repositories.

Modern business enterprises generate sizeable amounts of data concerning the operation and performance of their businesses. This data is typically stored within a large data warehouse, or some other large database infrastructure. Business analysts then review this voluminous data in order to make business recommendations. The data may be analyzed manually, in order to develop an intuition about the data, or to pick up patterns in the data, or it may be analyzed using statistical software to determine trends, clusters of data, etc.

More recently, with the explosion of Internet-related traffic, business enterprises are generating volumes of data that are one or more orders of magnitude larger than before. This increase in scale has made it almost impossible to develop an intuition about the data or to pick up patterns in the data by simply examining the data in its original form. Similarly, this increase in scale has made it difficult to manually execute separate statistical analyses on the data. Knowledge repository software applications have surfaced, but remain difficult to use on a wide-scale. Much of this difficulty stems from using traditional cumbersome methods of interfacing with the software applications.

The present invention overcomes these difficulties and others. In accordance with the teachings of the present invention, a computer-implemented knowledge repository data interface system and method are used by client applications to interact with a plurality of knowledge repositories. The knowledge repositories contain analytical models of interest to the client applications. A request handling module receives a request regarding the models from one of the client applications over a network. Knowledge repository application programming interfaces (APIs) are used to retrieve data about the models in the knowledge repositories based upon the received request.

BRIEF DESCRIPTION OF THE DRAWINGS

FIG. 10 is a graphical user interface depicting a model search interface being provided to the end user;

FIG. 11 is a graphical user interface depicting search results being sent by a remote web server;

FIG. 12 is a graphical user interface depicting a portion of the details of an online purchase model that relates to male children;

FIG. 13 is a graphical user interface wherein an end user may use the interface to evaluate a group of models;

FIG. 15 is a block diagram depicting an example model repository structure;

FIG. 17 is a block diagram depicting a data structure for a main-type index that is part of a model repository;

FIG. 18 is a block diagram depicting a first type of tree-type index that is part of a model repository;

FIG. 19 is a block diagram depicting a second type of tree-type index that is part of a model repository;

DETAILED DESCRIPTION OF THE PREFERRED EMBODIMENT

Figure 1:
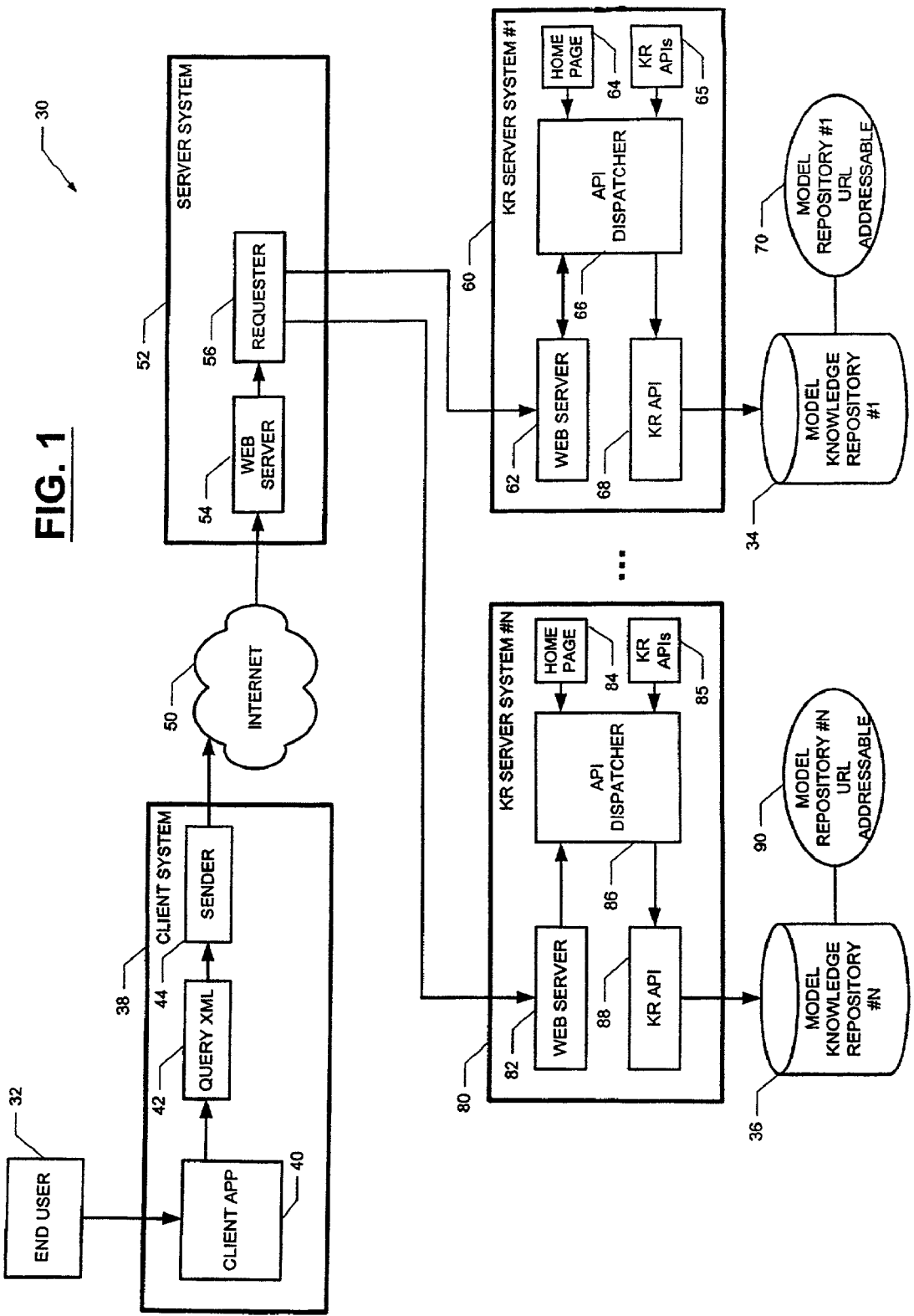
FIG. 1 is a system block diagram depicting computer-related components that provide interfaces to one or more knowledge repositories.

FIG. 1 is a block diagram depicting at 30 a knowledge repository interface system. The knowledge repository interface system 30 provides an end user 32 with a powerful and user-friendly interface to remotely access knowledge repositories 34 and 36. An end user 32, such as a human operator or computer application, may need to execute or review results from sophisticated models contained in the knowledge repositories 34 and 36.

The types of models differ based upon the needs of the end user 32. For example if the end user 32 is a business analyst, then the models may analyze customer survey responses or the types of web sites their customers visit. If the end user 32 is a rocket scientist, then the models may be finite element analysis fluid flow models or fuzzy logic engine control models (or other heuristic type algorithms). As still another example, a knowledge repository may concern the construction of a vehicle. Each model in the knowledge repository contains a portion of the knowledge used to construct a vehicle.

Typically, knowledge repositories contain numerous models to analyze the problems at hand. The numerosity results from different analysts contributing models to the knowledge repositories to study many different aspects of the problems. Not only are numerous models used to analyze the many different aspects of a problem, but also the models evolve over time. Model evolution may result in refinement, in which case the end user 32 would want to be certain that the end user 32 is using the latest version.

However to further complicate the situation, model versions may also reflect that different variables were tried with different versions. While a later model version may have suited one analyst's problem, the end user 32 may be more interested in the variables analyzed in an earlier version. The knowledge repository interface system 30 allows the end user 32 to easily and quickly locate the one or more models that best serve the end user's needs.

For example, the end user 32 may know that a decision tree model in one of the knowledge repositories will solve the end user's problem. However, the end user 32 only knows that the desired model was generated sometime between Jun. 1, 2001 and Jul. 31, 2001. The end user 32 provides a request to the knowledge repository interface system 30 for decision tree models that fall within that date range.

To submit requests to the knowledge repositories 34 and 36, the end user 32 invokes a client system 38. Within the client system 38, a client application 40 receives information from the end user 32 sufficient to formulate a request for the knowledge repositories 34 and 36. A data format, such as an extensible markup language (XML), may be used as the communication format between the client system 38 and the remote server system 52. A query XML module 42 translates the end user's request into an XML format. The XML formatted request might be requesting what models are contained in the knowledge repositories 34 and 36.

A sender module 44 transmits the XML formatted request using the web address of the remote server system 52. The web address may be the uniform resource locator (URL) of the remote server system 52. In a web environment, the sender module 44 uses the hypertext transfer protocol (http) to issue the request. However, the sender module 44 may use other types of protocols depending upon what protocols are compatible with the network environment at hand.

Within the remote server system 52, a web server 54 receives the request over the Internet 50. The web server 54 sends the XML formatted request to a requester module 56 (i.e., a request handling module). The requester module 56 contains an XML parser for determining the nature and details of the request. Because a request may involve more than one knowledge repository, the requester module 56 ascertains which knowledge repositories concern the request. For example if there were twenty knowledge repositories, the requester module 56 may ascertain that only three of the twenty knowledge repositories are relevant to the request. In another situation, all twenty knowledge repositories may be involved as when the requester module 56 receives a general request from the client system 38 as to what models are contained in the knowledge repositories. In such a capacity, the requester module 56 acts in part as a coordinator to optimize request handling among the different knowledge repositories. The requester module 56 may use a knowledge repository configuration file that indicates what knowledge repositories are located "downstream" on knowledge repository servers to handle incoming requests. The configuration file may also provide instructions on how to "scope" the search. For example if a knowledge repository is added to handle incoming requests, the configuration file is updated to reflect the augmented informational scope that is available for searching due to the new knowledge repository. The configuration file may be a text file which allows configuration changes without necessitating a change to and re-compiling of the executable code of the requester module 56.

After the requester module 56 ascertains which knowledge repositories are needed to service the request, the requester module 56 formulates specific requests for these ascertained knowledge repositories. The specific requests are sent to the web servers that connect these knowledge repositories. For example, the specific requests may be sent to knowledge repository server systems 60 and 80 because they contain the knowledge repositories (e.g., 34 and 36) that can service the client's request. The requests formulated by the requester module 56 are transmitted to web servers 62 and 82 via their URL addresses. In this way, the knowledge repositories 34 and 36 are URL addressable as respectively indicated at reference numerals 70 and 90.

By way of an example, consider the processing performed by the web server 62 of a request from the requester module 56. Suppose that the request is to return information contained in the knowledge repository 34. An application programming interface (API) dispatcher 66 determines which API (or set of APIs) from a list 65 of knowledge repository APIs is needed to retrieve the requested information from the knowledge repository 34. Each API corresponds to an operation that can be performed upon the knowledge repository 34. An API may query the knowledge repository for what models are contained in that knowledge repository, or as another example an API may retrieve a specific model at the request of the end user 32. The names of the APIs may indicate their function, such as for example: getAllModels, getSiblingModels, getTargetVariable, getInputVariableList, getLift, getPercentResponse, getPercentCapturedResponse, getProfit, getROI (i.e., return on investment), getDiagnostic, getFitStat, and the like.

If the request is to return the knowledge repository home page, then the API dispatcher 66 retrieves its home page to send back to the server system 52. The home page may contain top-level model information, such as what is the general subject matter of the models contained within the knowledge repository.

A knowledge repository server system may contain both similar and different APIs from other knowledge repository server systems. For example, all knowledge repository server systems may contain the general API that retrieves all models contained in their own knowledge repositories. Knowledge repository server systems may also contain different APIs in order to provide information specific to their respective knowledge repositories. Suppose that knowledge repository server system 60 contains only decision tree models while knowledge repository server system 80 contains only fuzzy logic models. Knowledge repository server system 60 would contain APIs specific to how decision tree models are structured, and therefore would be able to process requests involving decision tree splitting values and the like. On the other hand, knowledge repository server system 80 would contain APIs specific to how fuzzy logic models are structured. Such APIs would understand how to handle requests for fuzzification mapping data and the like. However, it should be understood that a knowledge repository server system may contain APIs to handle model types that are not contained in its knowledge repository.

After the API dispatcher 66 selects the appropriate API to handle the request, an API execution module 68 uses the selected API to issue a query to the knowledge repository 34.

Figure 2:
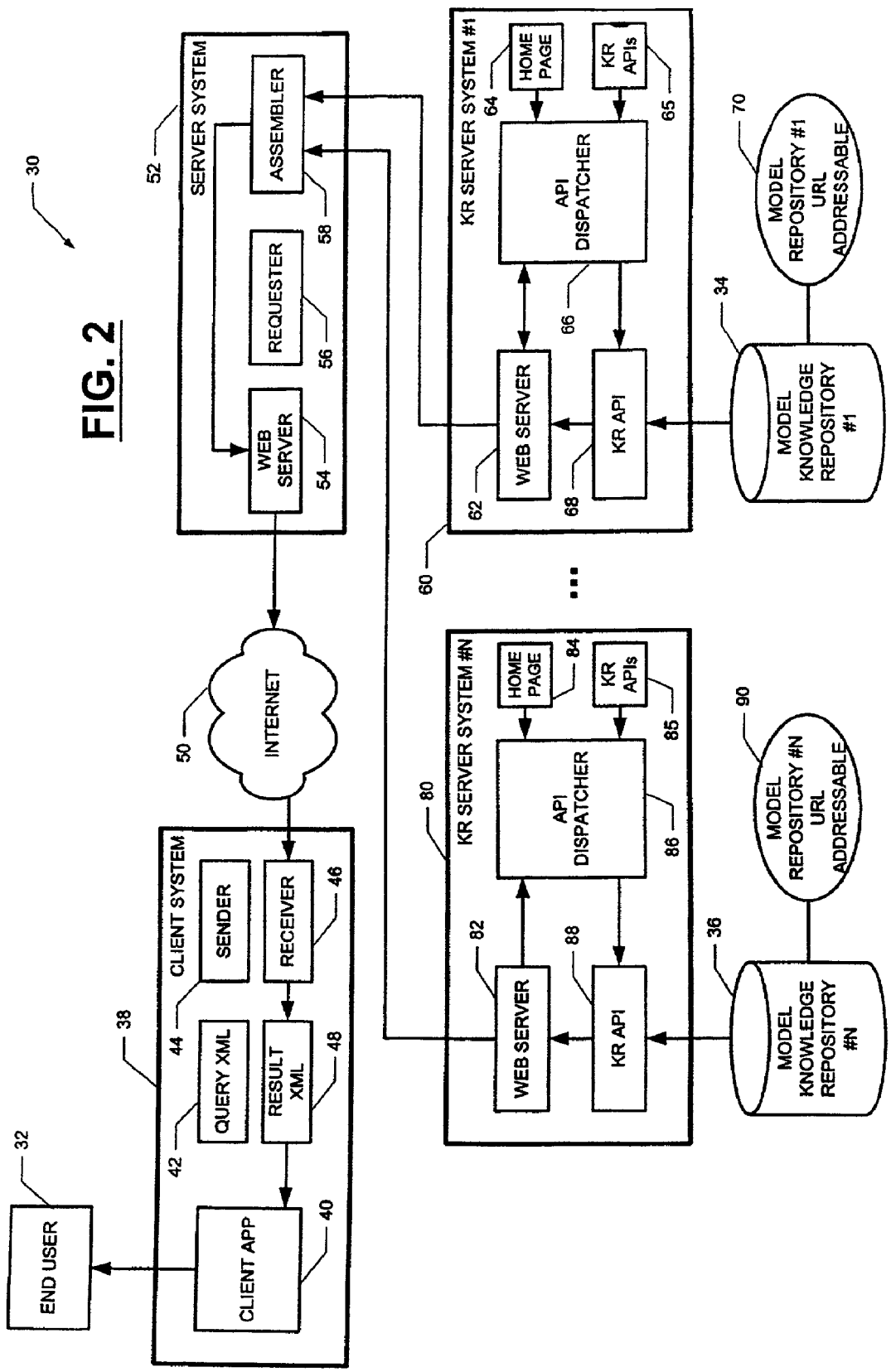
FIG. 2 is a system block diagram depicting query results being processed in order to be sent back to a client system.

FIG. 2 depicts how the query results are processed in order to be sent back to the client system 38. With reference to FIG. 2, query results are obtained from the knowledge repository 34 through execution of the API. The API execution module 68 sends the query results to the web server 62 so that they may be provided to the server system 52. An assembler module 58 receives the query results from the web server 62. If the requester module 56 did not dispatch requests to other knowledge repository server systems, then the assembler module 58 converts the query results into an XML formatted message and sends it over the Internet 50 to the originally requesting client system 38.

If the requester module 56 had dispatched requests to other knowledge repository server systems, then the assembler module 58 waits until the other knowledge repository server systems have provided their query results. The assembler module 58 examines the query results from each of the knowledge repository server systems in order to best package the results. This may include eliminating redundant query results. The assembler module 58 converts the multiple query results into an XML formatted message and sends it over the Internet 50 to the originally requesting client system 38. It should be further understood that the query processing performed by the assembler module 58 may also be performed in an asynchronous mode.

A receiver module 46 operating within the client system 38 accepts the message and passes it to a result XML module 48. The result XML module 48 includes a conventional XML parser to extract the reply to the end user's request. The client application 40 provides the reply to the end user 32. Based upon the reply, the end user 32 may initiate another request, such as obtaining more detailed model information now that the end user 32 knows what models are available to the end user 32.

Figure 3:
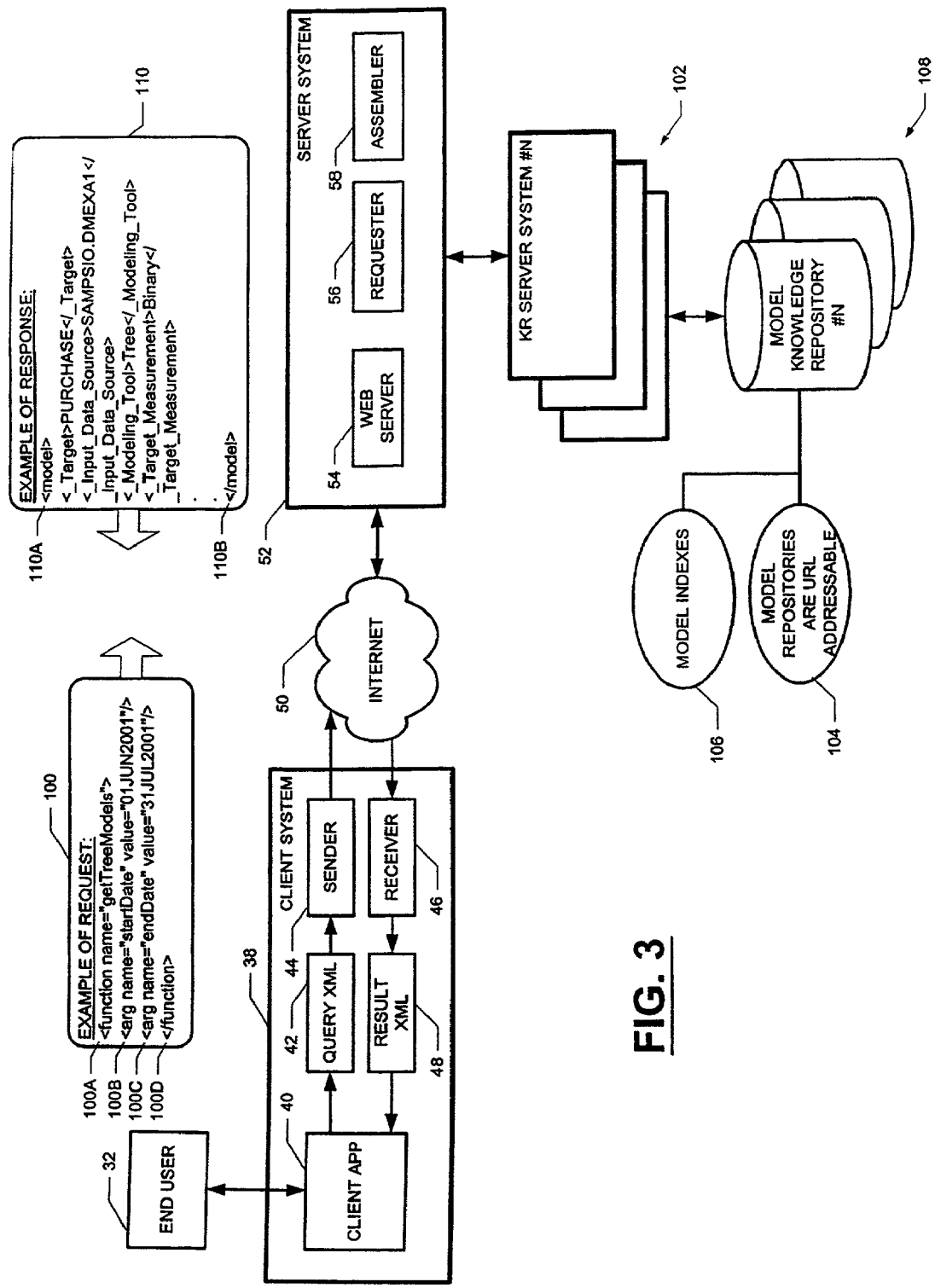
FIG. 3 is a system block diagram showing an example of an XML formatted request to and response from a knowledge repository interface system.

FIG. 3 shows an example of an XML formatted request 100 to and response 110 from the knowledge repository interface system. The request 100 encloses within tags 100A and 100D the function requested by the end user 32 to be performed. Encapsulated within tags 100A and 100D are argument tags 100B and 100C. Argument tags 100B and 100C specify the date criteria.

The request 100 is sent to the remote server system 52. The requester module 56 queries the knowledge repository servers 102 via their URLs so that they may report whether they contain any decision tree models that satisfy the end user's criteria.

The knowledge repositories 102 may use model indexes 106 to speed up the model searching process. A model index contains metadata about what is stored in its associated knowledge repository, such as what decision tree models (if any) are stored in the knowledge repository. Even more detailed metadata may be contained in the model index such as what splitting variables were used for the models.

The selected knowledge repository APIs recognize whether they may search a model index for the information needed, or may bypass the model index and directly query the model data contained in the knowledge repositories. In some situations, the selected knowledge repository APIs search the model indexes in order to locate where in the knowledge repositories the requested data is located. In still other situations, the selected APIs search the model indexes to locate a portion of the requested data and then query the model data in the knowledge repositories to locate the other portions. It should be understood that the location of the model indexes may vary. A model index may be located separately from the knowledge repository on the knowledge repository server system, or located within the knowledge repository on the server. Still further the model index may be located on the remote server system 52 to prevent in certain situations the need to query the knowledge repository server systems.

The multiple knowledge repository search results are sent back to the assembler model 58 which formats the query results in an XML format 110. Tags 110A and 110B demarcate the starting and ending tags for information about one of the located models. Response 110 may include additional model tags for any other decision tree model that satisfies the end user's request.

Within the beginning and ending model tags 110A and 110B may be detailed model information, such as what the target variable of the decision tree model was (e.g., "Purchase") and other information such as the date and version of the model. The analytical model specific tags allow much flexibility and model information to be provided to the user. The XML response message 110 is sent to the client system 38 where the result XML module 48 parses the response message 110 for presentation to the end user 32.

Figure 4:
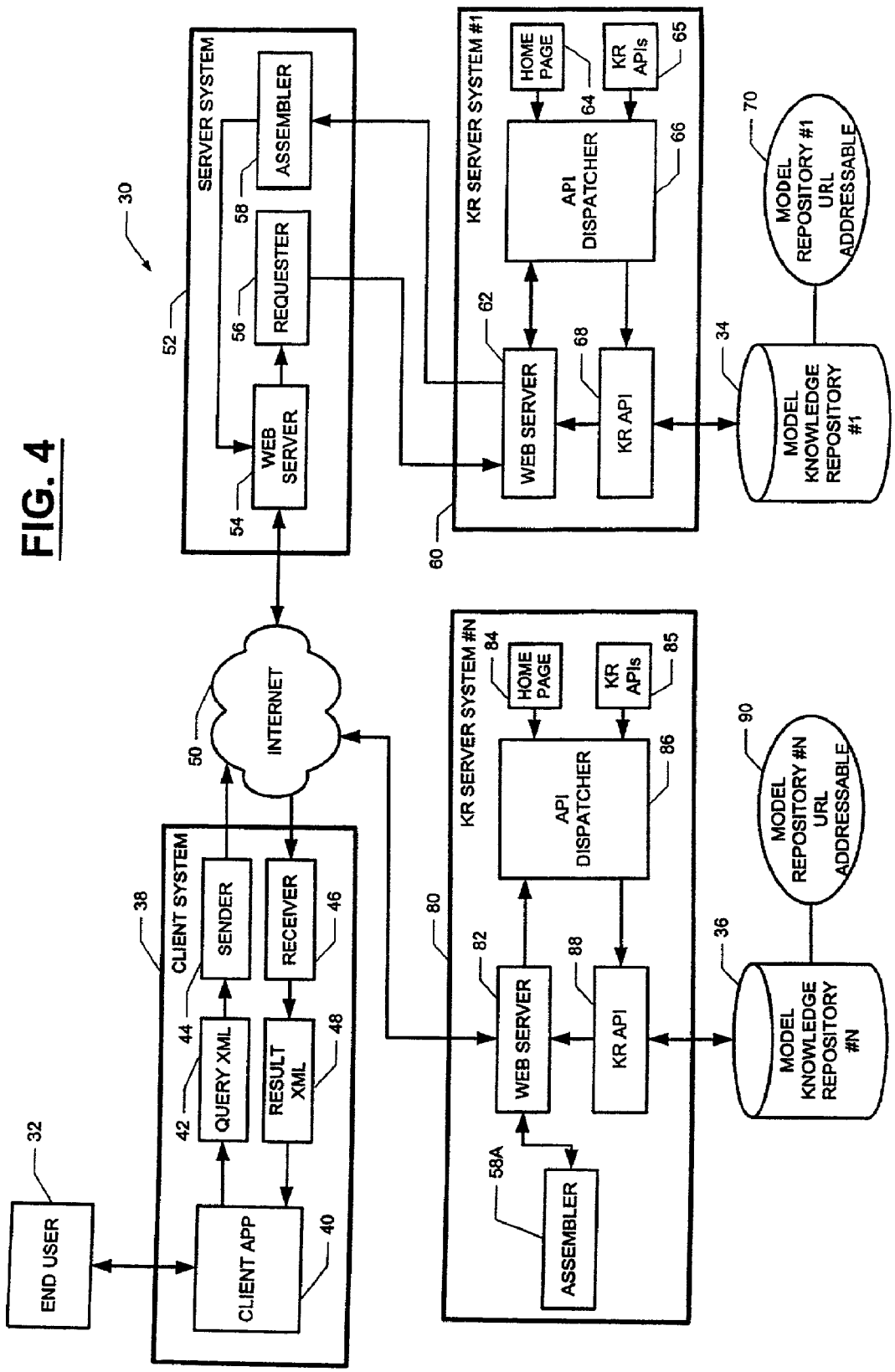
FIG. 4 is a system block diagram showing a client system directly accessing a knowledge repository.

FIG. 4 shows the client system 38 directly accessing knowledge repository 36. If the client system 38 knows that knowledge repository 36 (located at URL 90) contains the model of interest to the end user 32, then the request may be sent directly to the knowledge repository server system 80 at URL 90. Upon receipt of the request, the knowledge repository server system 80 directly processes the request. The server's API dispatcher 86 selects the appropriate knowledge repository API to service the request.

Any query results may be processed through an assembler 58A that is resident on the knowledge repository server system 80. It should be noted that the knowledge repository interface system 30 may include an API function that provides knowledge repository URL information to the client system 38 so that the knowledge repositories may be directly accessed.

It should be understood that client systems may be accessing the knowledge repository interface system 30 without utilizing XML. In such cases, any commercially available structured request format may be used to transmit the request. The knowledge repository interface system 30 sends back responses to such client systems in a format understandable by the client systems.

Figure 5:
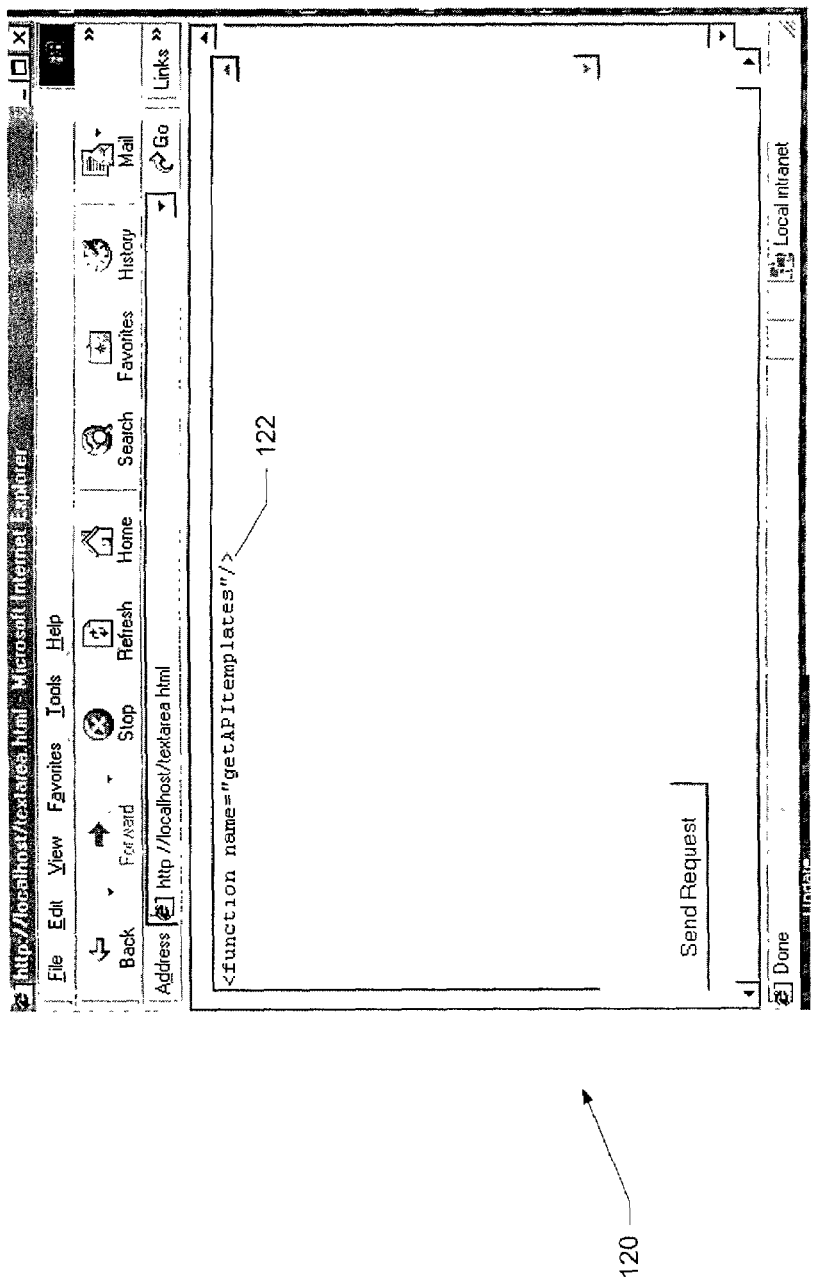
FIG. 5 is a screen shot showing use of an API to access knowledge repository-related information.

FIGS. 5–8 show exemplary interchanges of information between the client system and the knowledge repository interface system. The interchanges show how a client system learns what knowledge repository APIs are available and how to construct on-the-fly a query based on an API to solve the problem at hand. With reference to FIG. 5, an XML formatted request is shown at 120 for obtaining what API functions are available to the end user and what their invocation structure is. The API invocation structures may be sent to an end user for formatting its knowledge repository requests. For example, function tag 122 indicates that the API whose function name is "getAPItemplates" is to be invoked so that the end user may learn what are the available APIs and their structures. It is noted that a client system need only initially know this request to be able to learn all authorized APIs of the remote knowledge repositories (note that the security aspects are discussed later).

Figure 6:
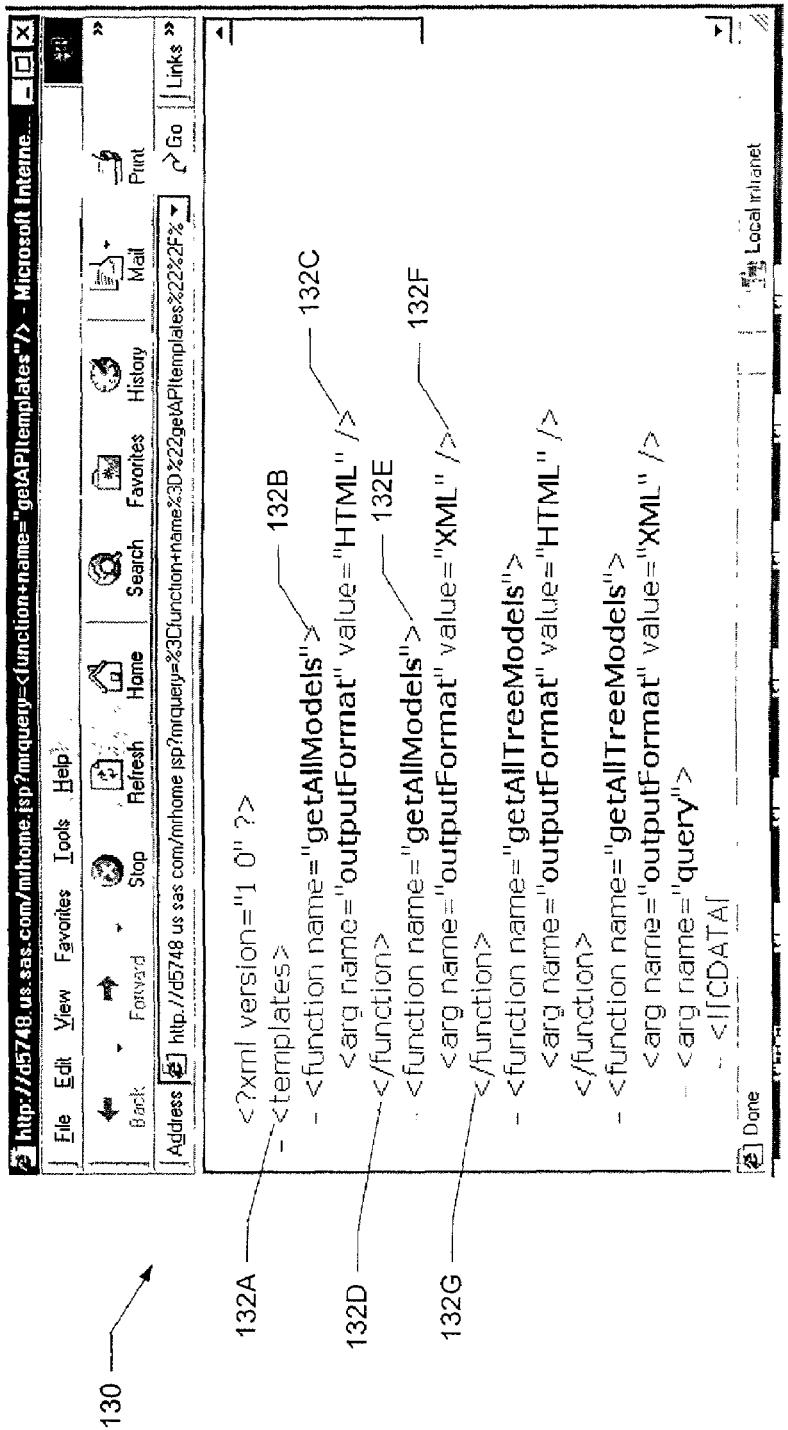
FIG. 6 is a screen shot showing an XML formatted response to a "getAPItemplates" request from a remote web server.

FIG. 6 depicts at 130 the XML formatted response to the "getAPItemplates" from the remote web server. The templates tag 132A contains the API templates available to the client system. For example, the "getAllModels" API name shown within the function tag 132B is available for use and may be invoked properly if the client system adheres to the structure indicated within the "getAllModels" function tags 132B and 132D. Note that a utility can be created so that it is easier for the calling application to construct the XML stream (i.e., the function call). Tag 132C indicates that a request for this API includes an argument named outputFormat tag 132C. The outputFormat argument tag 132C specifies in what format ("XML") the query results generated from invoking this API should be formatted. The "getAllModels" API may also be invoked with a request for a different output format, such as an XML format. The structure for this invocation is shown by tags 132E, 132F, and 132G. With the client system knowing the structure for invoking the knowledge repository API, the client system can issue another request.

Figure 7:
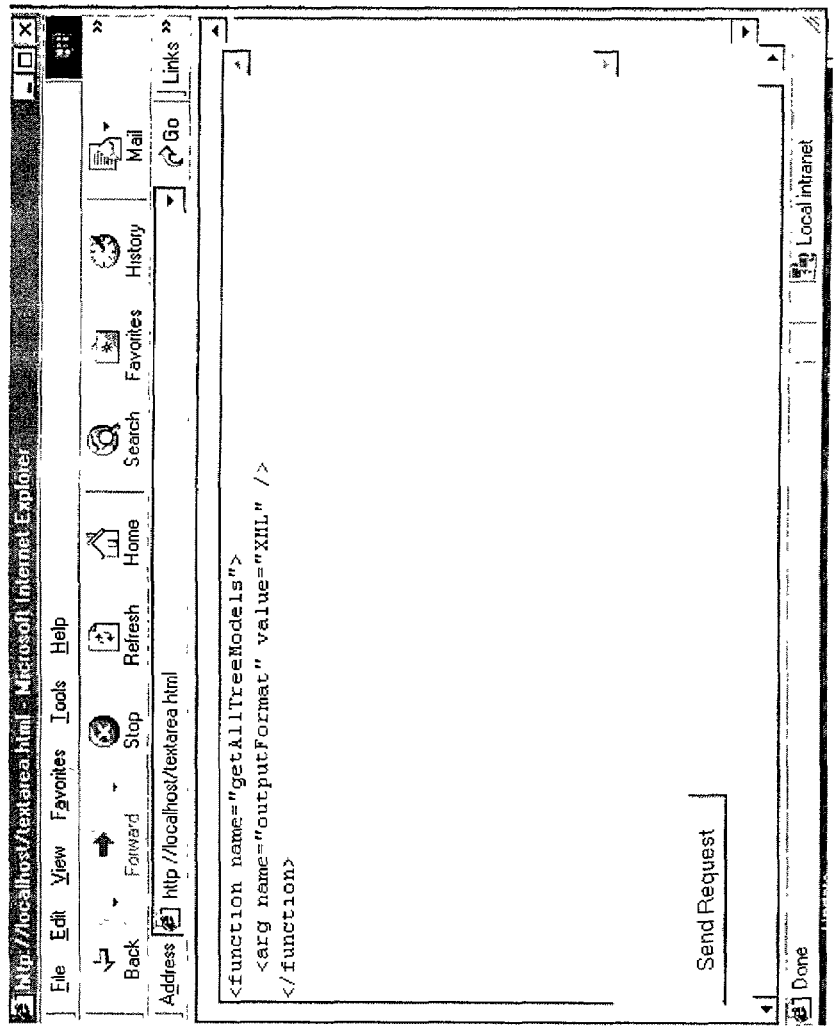
FIG. 7 is a screen shot showing a client system issuing a "getAllTreeModels" API.

With reference to FIG. 7, the client system issues at 140 as a second request the "getAllTreeModels" API whose structure was returned by the remote web server. The request instructs the remote web server to return a list in an XML format of all decision tree models that are contained in the remote knowledge repositories.

Figure 8:
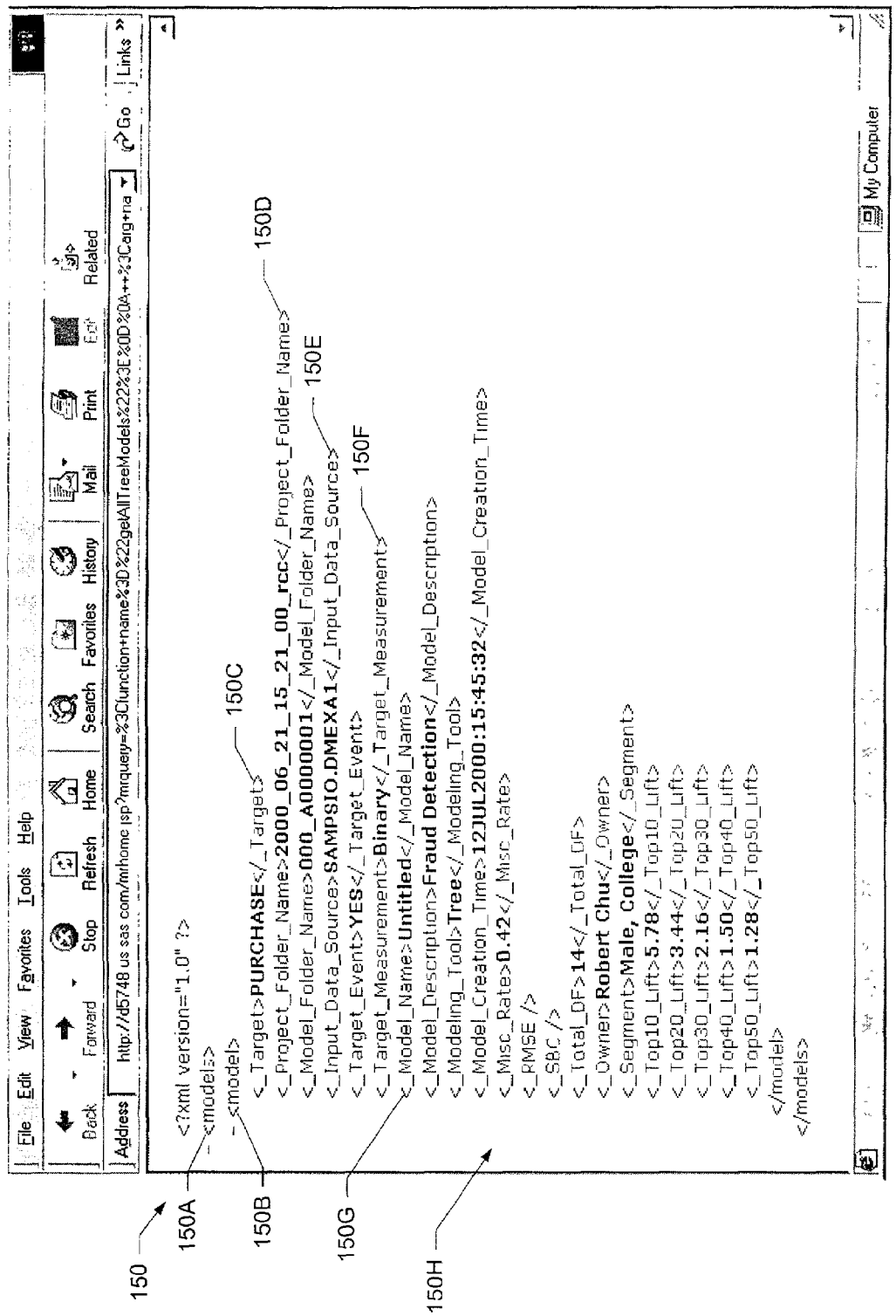
FIG. 8 is a screen shot showing a remote web server's XML formatted response to a "getAllTreeModels" API.

The remote web server's XML formatted response is shown at 150 in FIG. 8. The XML formatted response 150 may contain multiple decision trees models within the models tag 150A. A listing of one decision tree model is shown by the model tag 150B. Details of the decision tree model are indicated by various tags within the model tag 150B, such as: the target variable analyzed by the decision tree model (as shown by tag 150C); the project within which the model is associated (as shown by tag 150D); the input data source (as shown by tag 150E); the target measurement type (as shown by tag 150F); the model name (if any) (as shown by tag 150G); various attributes of the decision tree model (as generally shown at 150H); and the like.

The back-and-forth information interchanges between the client system and the remote web server may be used to build queries on-the-fly for a model repository software application. The return codes from the function calls can thus be tested. The interchanges may occur in the XML data formats shown in FIGS. 5–8. However, it must be understood that other formats may be used for the interchanges. For example, the remote web server may present its results as a formatted web page, where a user may select which operations are to be performed upon the remote knowledge repositories through combo boxes, checkboxes and the like. FIGS. 9–13 depict such an exemplary scenario.

Figure 9:
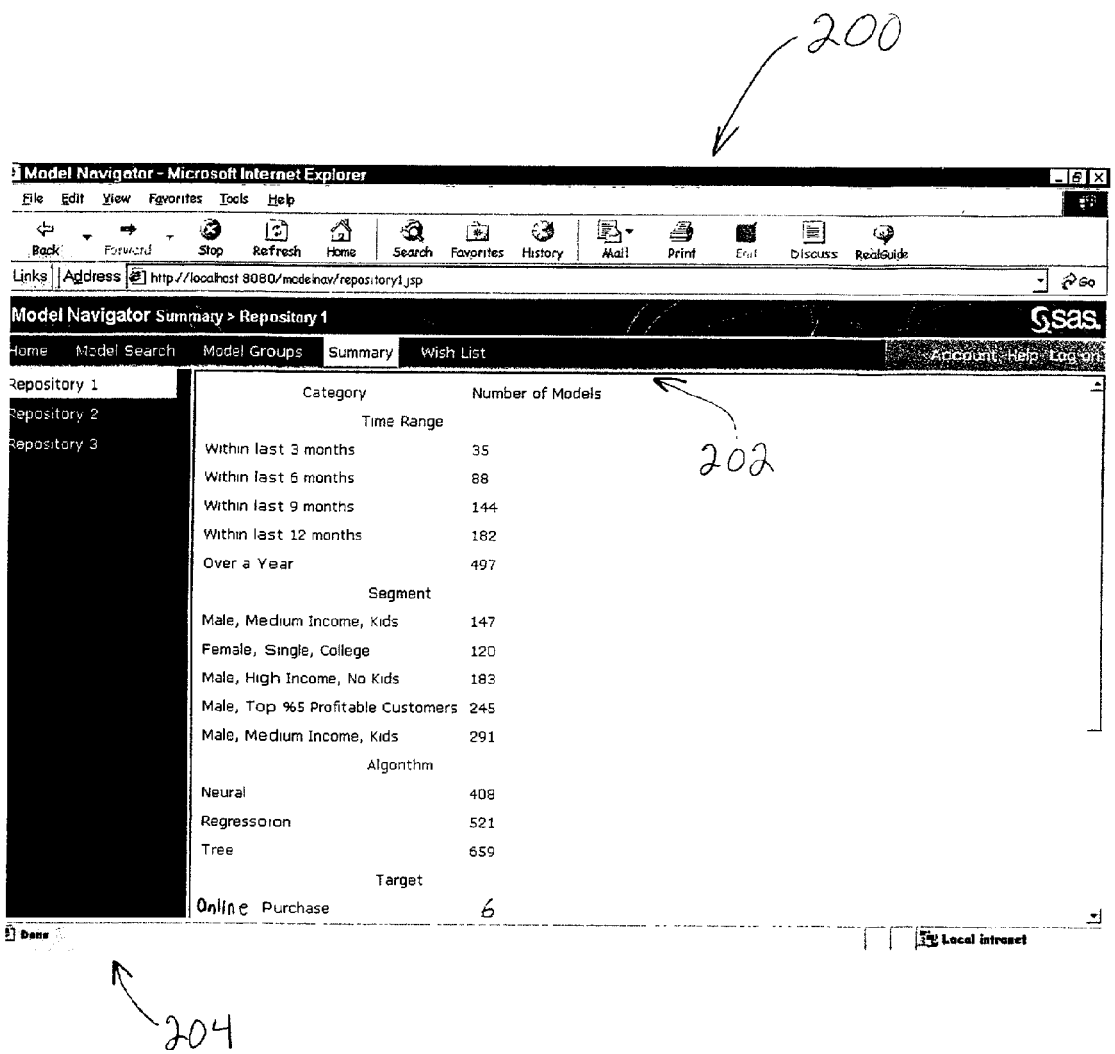
FIG. 9 is a graphical user interface depicting a format for visually showing query results.

With reference to FIG. 9, interface 200 shows query results sent in an HTML format to the client system. The client system presents the query results as web pages to a human end user. The different viewing options are shown at 202, wherein an overall summary of the query results or the entire knowledge repository may be viewed by selecting the "Summary" button. A new model search may be performed by the end user by selecting the "Model Search" button, or the user may view the groups of models available for searching by selecting the "Model Groups" button. Other views and options may be created to suit the situation at hand.

The end user is presented with a category breakdown for knowledge repository 1. By selecting the other buttons indicated at 204, the end user may see a category breakdown for knowledge repositories 2 and 3. For the currently selected knowledge repository (i.e., "Repository 1"), the categories include: the time range in which the model was created; segment name; algorithm type; target variable; etc. The number of models in knowledge repository 1 that fall within each category is also listed. For example, thirty-five models have been created in knowledge repository 1 within the last three months. As another example, six models have studied online purchasing characteristics of customers as a target variable.

If an end user is interested in models that concern this characteristic, then the end user knows to issue a request to knowledge repository 1. The end user selects the model search button within region 202 to go to the search interface shown in FIG. 10.

Figure 10:
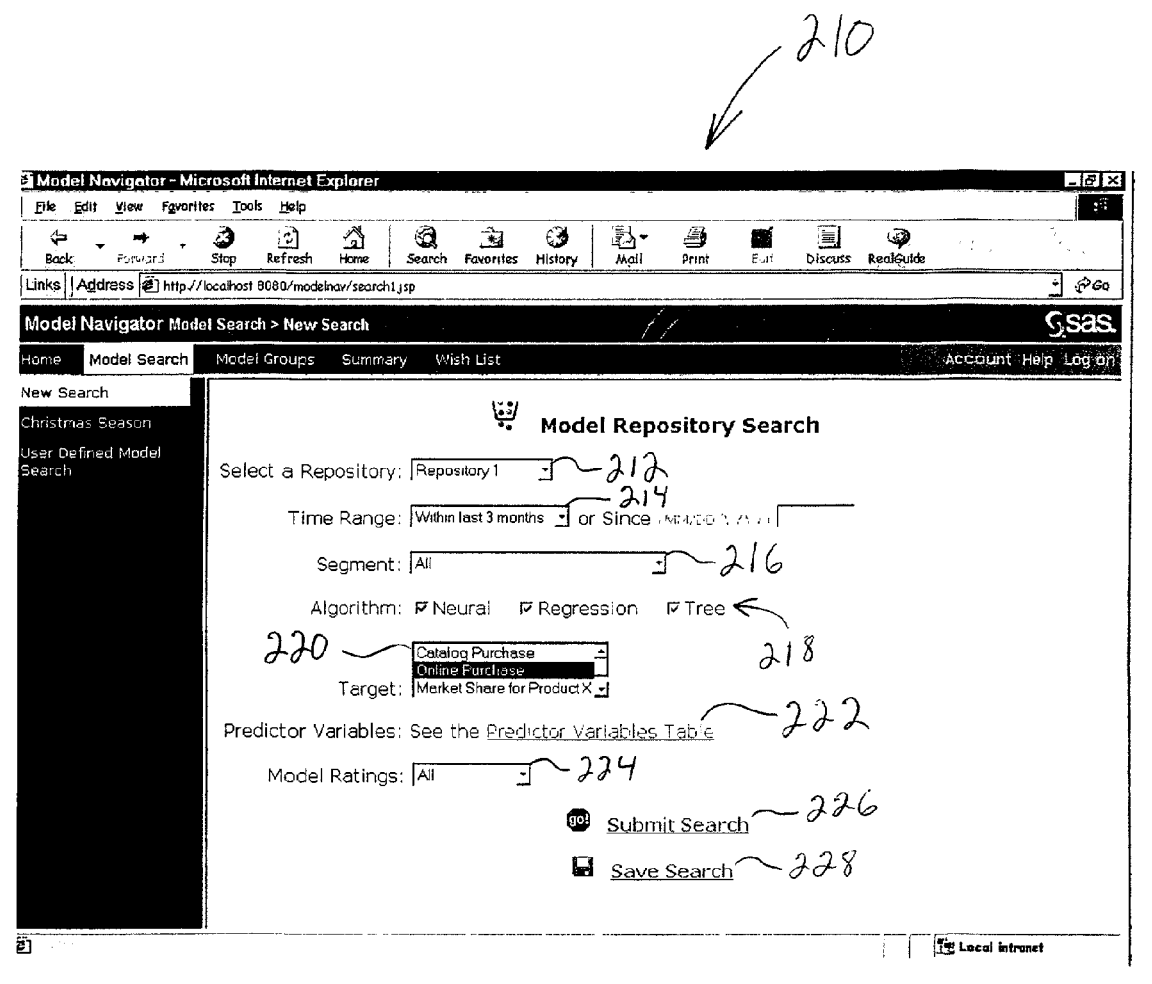

With reference to FIG. 10, a model search interface is provided to the end user at 210. Repository 1 is selected via pull down control 212, and the end user specifies via control 214 that only models within the last three months are to be retrieved. All segment names are selected via control 216, as well as the algorithm type via controls 218. The "Online Purchase" target variable is highlighted at control 220. The end user may also select hyperlink 222 to see the model predictor variables in order to further subset the search results.

At control 224, the end user may specify that only models which have been highly rated by model designers and other end users may be selected. The search is submitted to the remote web server when the end user activates hyperlink 226, or the search criteria may be saved by activating hyperlink 228 for submission at a later time. When the end user selects the search request submission hyperlink, the web server retrieves the model information that satisfies the search criteria.

Figure 11:
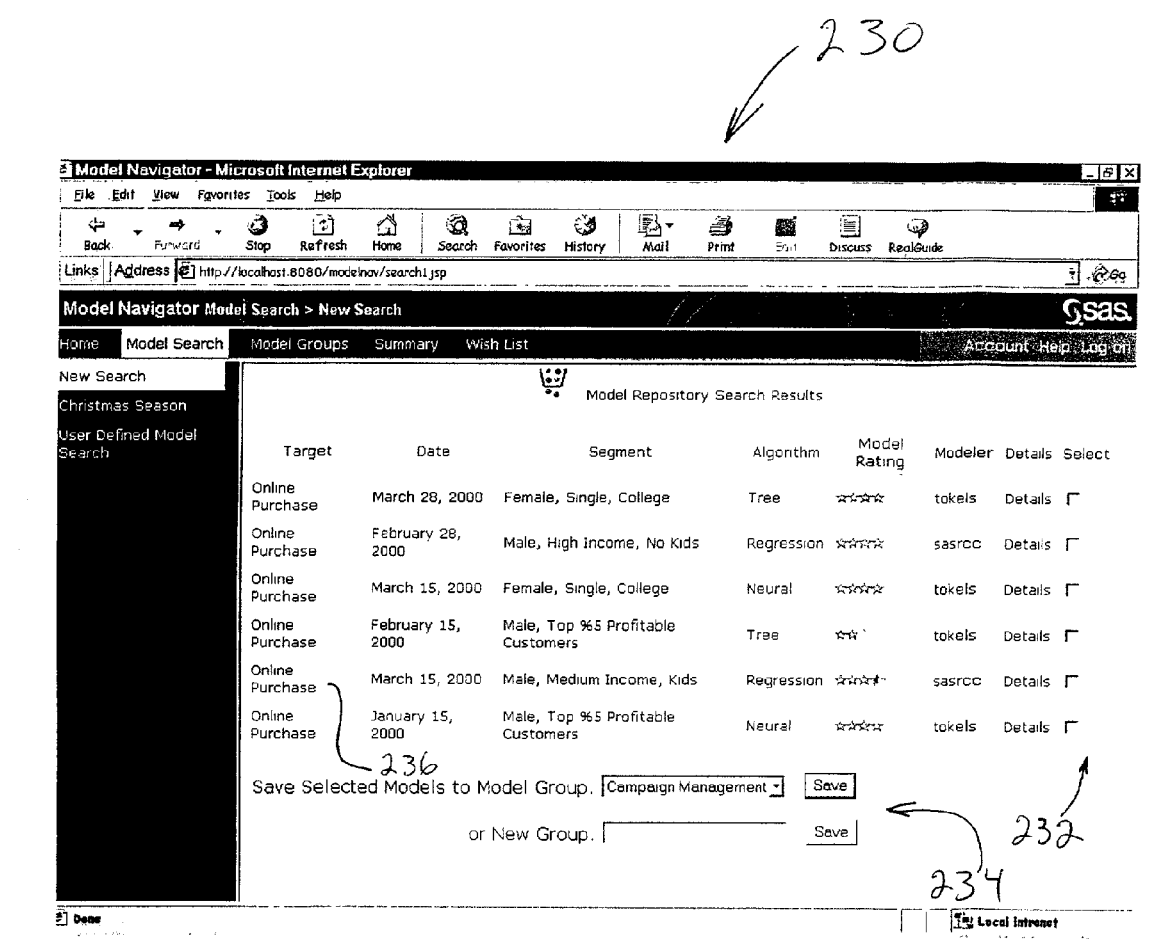

Based upon the request, search results are sent by the remote web server as shown in FIG. 11 at 230. The search results match the end user's criteria. The end user may find several of the online purchase models of keen interest and select via select column 232 one or more of them so that they may be saved in a model group via controls 234. A listing of the selected model identifiers can be saved on the client system, or alternatively in a different location specified by the end user, such as on the remote web server or in another persistent store that is controlled by a knowledge repository web server. If the end user is particularly interested in online purchase models that relate to male children, then the end user may select model 236 via column 232.

FIG. 12 depicts a portion of the details of the online purchase model 236 that related to male children. The end user may examine statistical details of the model, such as the average squared error as shown at 240. The end user may also examine project details of the model, such as who created the model and for which department, as shown at 242. Because the "BESTINGROUP" value of "No" indicates that another model is superior, the end user may contact the model designer or the project department to locate a better model or by searching for sibling models. Still further, the end user may use a knowledge repository API to specifically ask for the highest rated online purchase model that relates to male children.

An end user may evaluate a group of models together as shown for example in FIG. 13. Interface 250 lists a user-defined group of models 252 that have been stored under the group name "Campaign Management Model Group". An end user may evaluate the models 252 by examining sibling models, historical models, or a diagnostic charts. Sibling models are models that have identical input data. Historical models are models that have the same target and segment. Diagnostic charts evaluate the predictive accuracy of a model.

Other model comparison techniques may be used, such as an input variable rank evaluation, which examines which input variables had the most pronounced effect upon the online purchase target variable. It must be understood that still other model comparison techniques may be used, such as examining the evolutions of each model that is to be compared. The examination provides a genealogical hierarchy of the selected models' evolution (i.e., a first model that has evolved into a second model which has further evolved into third and fourth models). A model's evolutionary hierarchy provides insight as to what variables were used at which stage of the evolution to attempt to solve the problem and what results were obtained. By understanding the model's evolution, the user can better understand how effective the model may be for the user's problem at hand. Based upon the evaluation, the end user may rate the selected models or remove certain models from the list of selected models 252.

Figure 14A:
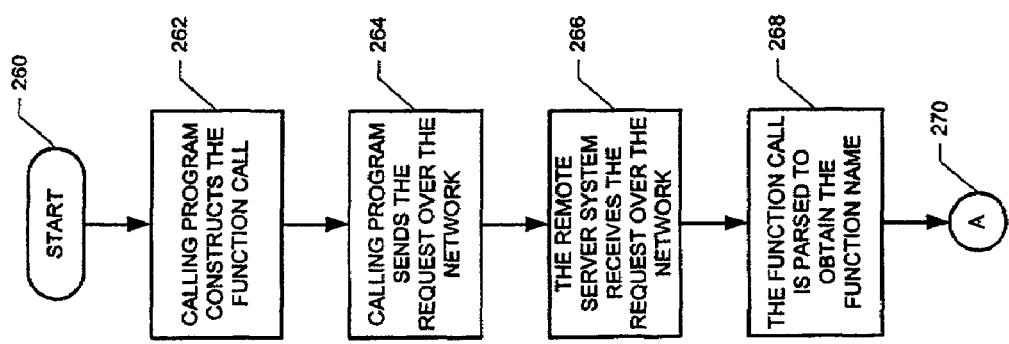
FIGS. 14A and 14B are flow charts depicting an operational scenario example of a computer program interacting with remote knowledge repositories.
Figure 14B:
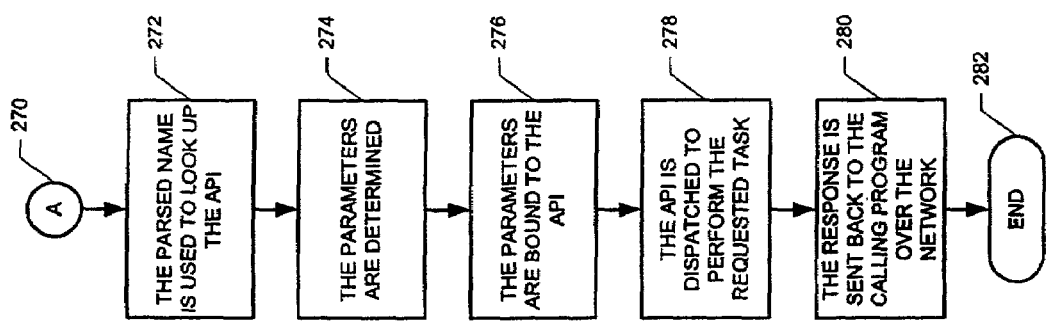

FIGS. 14A and 14B depict an operational scenario example of a computer program (as an end user) interacting with the knowledge repository interface system. The computer program may be written in such languages as Java, C++, or any language that can send a request over the Internet to a specified URL and receive the response. With reference to FIG. 14A, start indication block 260 indicates that the computer program constructs a function call at process block 262. The computer program may construct the API function call by using the following syntax:

```
<function name="function_name" >
    <arg name="x1" value="y1"/>
    .
    .
    .
    <arg name="xn" value="yn"/>
</function>
```

(where function_name is the function that is being called, the argument x1 is set to the value y1, . . . , and the argument xn is set to the value yn.)

When a computer program submits a function call, it may resemble the following:

```
<function name="getModel">
    <arg name="project"value="EOY"/>
    <arg name="diagram"value="000"/>
    <arg name="model"value="A000072" />
</function>
```

However, it should be understood that other formats may be used, such as:

getModel(project="EOY", diagram="000", model="A000072");

The request is sent over the network at process block 264 and is received by the remote server system at process block 266. If the request is in an XML format, the function call is parsed by an XML parser. Processing continues on FIG. 14B as shown by continuation block 270.

With reference to FIG. 14B, the parsed name of the function call is used at process block 272 to select the proper knowledge repository API(s). It is noted that the function call contained in the request may have the same or different name from the selected knowledge repository API, and even may map to multiple knowledge repository APIs, with each API performing a part of the task. In this way, the calling computer program can send the same function call to multiple types of knowledge repositories data stores without having to tailor the query to each one. It is also noted that if the API evolves over time, the remote server system may detect which version of the API is being used by the calling computer program and return the response corresponding to that version. Because tagging (XML, HTML, etc.) languages evolve over time, the called program may further detect which version of the tagging language is being used and return the response corresponding to that version (e.g., <function name="getTreeModels" version="2.5">).

Process blocks 274 and 276 parse the parameters contained in the request and bind the request to the API. If the process blocks determine that the parameters are incompatible with the knowledge repository API, then a notification message is sent to the calling computer program. However if no errors arise, the knowledge repository API is dispatched at process block 278 to perform the requested task. At process block 280, the response is sent back to the calling computer program over the network. The computer program may initiate another request depending upon its examination of the current response. Processing terminates at end block 282.

FIGS. 15–20 provide internal structural details of the knowledge repositories. In the exemplary structures discussed in these figures, the model repositories are used as a form of knowledge repositories. However, it should be understood that such details are applicable to knowledge repositories in general.

With reference to FIG. 15, a system diagram 310 depicts a structure of a model repository 300. The model repository 300 may be used with a data mining application 318. The data mining application 318 can search through the large volumes of data stored in the data warehouse 332 and can identify patterns in the data using a variety of pattern-finding algorithms. These patterns are then accessed by the business analyst through the knowledge repository interface system in order to make business recommendations. An example of such a data mining tool is Enterprise Miner™, available from SAS Institute Inc., of Cary, N.C.

The data mining application 318 preferably includes an integrated model repository facility (MRF) 318A to control the export of models to the model repository 300, and the construction or update of one or more model indexes 326, 327, and 330. Alternatively, however, the MRF 318A could be a stand-alone application, in which case it would not be integrated into the data mining application 318.

The data mining application 318 analyzes data records stored in a data warehouse 332, or some other form of data storage facility. In particular, the data mining application 318 includes the decision tree processing module so that models with splitting variables may be generated, where the splitting variables are the variables in the data that best predict the outcome of the transactions. Although a single data warehouse 332 is shown in FIG. 15 for storing the data records, the data analyzed by the data mining application 318 could be spread out among numerous data warehouses 332 or numerous other database systems.

If the decision tree models are saved in the model repository 300, there are one or more dimension indexes (327 and 330) for the models. These indexes (327 and 330) include text representations, graph representations, pointers to model databases, and model level descriptions. These indexes are used to search the model repository for the decision tree models.

As described above, the data mining application 318 is executed using a particular model specification. A model specification typically indicates which input data to analyze from the data warehouse 332, which pattern-finding algorithm (such as a neural network, decision tree, fuzzy logic, etc.) to use for the analysis, how to partition the data, how to assess the results from the analysis, etc.

A data mining model, as generated, is a set of attributes related to a run of a data mining application or another type of statistical-related software application. For example, depending on the algorithm used to create the model, the attributes include the location of the input data, the scoring code, the fit statistics, and so on. However, it should be understood that data mining models can be generated by applications other than a data mining application, such as by a statistical modeling software application.

The models 322A, 322B, 322C that are generated by the data mining application 318 are initially stored in individual project folders 320. For example, each model creator 312 may have his or her own project folder stored in a database of project folders 320. The model creators 312 would then store their own models 322A, 322B, 322C in their individual project folders.

Using the model repository facility 318A, certain useful ones of the generated models 322A, 322B, or 322C can be selected and exported into the model repository 300. These useful models can then be searched for and retrieved manually by end users 316, or programmatically by end user applications 316. As described in more detail with reference to FIG. 16, the models 323A, 323B, 323N2 (of FIG. 15) stored in the model repository 300 are organized according to a plurality of logical levels, including a project level, a diagram level, and a model level. The project level may include one or more diagrams, each of which describes a particular set of model specifications. Each diagram at the diagram level may then be associated with one or more individual models at the model level.

With reference back to FIG. 15, for each level of the model repository structure, one or more additional descriptive attributes may be associated with the models. The attributes provide descriptive information about the model that can be used to identify a particular model in the model repository 300 via a search and retrieval process. These attributes may be automatically associated with the models by the data mining application 318, or by the model repository facility 318A when the model is exported to the model repository 300. In addition, any of the system users 312, 314, 316 may associate additional attributes with the models. The model attributes may be assigned at the project level, the diagram level, or at the individual model level.

These model attributes are then organized and structured into one or more indexes 326, 327, 330, which are also stored in the model repository 300. These indexes may include a main type index 326, which includes some or all of the attributes for each of the models 323A, 323B and 323N2 in the model repository 300, and/or may include one or more special indexes, such as a tree-type index 327, which includes the attributes for a sub-set of all the models stored in the model repository 300. For example, the tree-type index 327 would include certain attributes of those models that were generated using a decision-tree algorithm. As described above, the decision-tree algorithm generates a type of attribute known as splitting variables, which are stored in the tree-type index 327. Also shown in FIG. 15 is a mini-index 330, which provides a quick-search capability for the tree-type index 327. These various indexes are used by end users 316, or by end user applications 316, in order to find a particular model, or set of models, within the model repository by executing a search and retrieval operation on the attributes stored in the indexes 326, 327, 330.

A variety of system users can interact with the data mining application 318 and the model repository 300, including a model creator 312 (e.g., a model designer), a model repository administrator 314, and an end user 316. The model creator 312 is the person who operates the data mining application 318 in order to generate a particular model. The model creator 312 determines the specifications for a particular data mining run, generates the corresponding model based on the specification, and then stores the model in his or her individual project folder 320. Alternatively, the model creator 312 could take an existing model from one of the project folders 320, modify the specification in some manner, and then generate a new model. Moreover, because the data in the data warehouse 332 typically changes over time, a model creator 312 can use the same specification against a later version of the data to generate a new model based on the updated data. The model creator 312 may then utilize the MRF 318A to export certain useful models to the model repository 300.

The model repository administrator 314 performs a variety of functions. One of these functions is to control access to the model repository 300. This may include controlling access rights to certain users, such as read access rights and write access rights. In this manner, the model repository administrator 314 can control which users can add or over-write models in the model repository (those having write access) and which users can only read models (those having only read access). The model repository administrator 314 may also control the process of deleting models from the model repository. Control of model deletion is important to ensure that a user with write access does not inadvertently delete a useful model from the model repository 300. In addition, the model repository administrator 314 may also determine which model attributes will be included in the main index 326.

The end user 316 may be a person who is interested in using the models in the model repository 300. The end user 316 could also be a model creator 312, although not all end users will be creating models. The end user 316 accesses the model repository 300 and searches for an appropriate model 323A, 323B, 323N2 by possibly examining the one or more index structures 326, 327, 330. By supplying search parameters and then comparing these search parameters against the attributes stored in the index structures, the end user 316 is able to find one or more useful models. Having found a useful model, the end user 316 may then obtain a copy of the information contained in the model.

The end user 316 may also be an end user application program that programmatically searches for and retrieves an appropriate model from the model repository 300. The end user application program can send a search and/or retrieval request to the model repository 300 over a network, such as a local, wide area, or global (e.g., Internet) network. This search and retrieval capability makes it possible to automate the deployment of models for specific purposes. For example, suppose that part of the operation of an application requires that it find a "best" model (perhaps based on the one with the best assessment results). Or suppose that part of the operation requires the application to choose a model from many similar ones (perhaps based on the one that was most recently generated from certain input data). That part of the operation can be accomplished automatically using the indexes 326, 327, 330 to find the one or more models 323, and then by employing a comparison algorithm (which may be user-specified) to determine which model is most suitable for the particular task. For example, the comparison algorithm could look for the model with the lowest rate of misclassification. The ability to search for a model or models programmatically is particularly important in real-time applications, such as web-based applications, because a person could not find the appropriate model or models fast enough to suit the real-time nature of the task. The selected model 323 then could be used by the end user 316, for example to generate scored data 334.

In addition, with the appropriate access level, an end user 316 could from time to time make a copy of the index(es) 326, 327, 330 and modify them in order to improve performance. Search and retrieval performance on the indexes would be improved because the modified copies would be stored locally to the end user, and because the copies could contain only the rows and columns of the index structure needed for his or her purpose. In this manner, each end user 316 could maintain his or her own index structures for the model repository 300.

Although a single model repository 300 is shown in FIG. 15, this is just one example of system 310. Alternatively, a particular business enterprise may have more than one model repository 300. In addition, a given model repository 300 may have more than one main-type index 326, or more than one special-type indexes 327, 330. For example, the marketing group of a particular business could have their own main index structure 326 that is based on the model attributes that matter for their purposes, and the sales group could have their own main index structure 326 that is based on other model attributes that matter for their purposes. Although a particular model repository 300 may have more than one special-type index 327, it is preferable that for the particular type of special-type index, such as the tree-type index 327 and mini-index 330, there would be only one of that type of index for each model repository 300.

Figure 16:
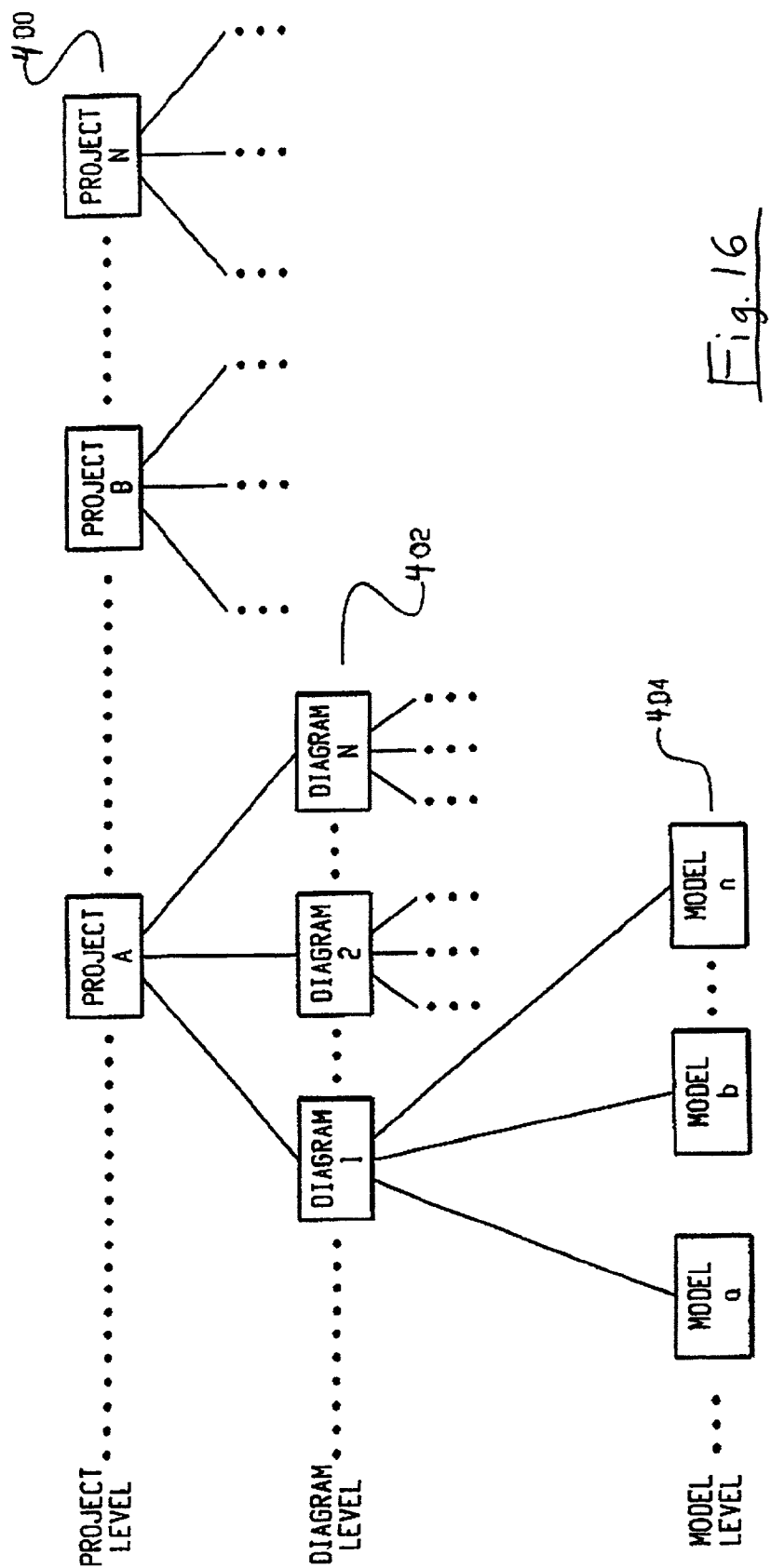
FIG. 16 is a block diagram depicting models stored in a model repository being organized according to a plurality of logical levels.

FIG. 16 is a diagram showing a preferred structure for storing models within the model repository 300. According to this preferred structure, the model repository 300 is organized into three levels, the project level 400, the diagram level 402, and the model level 404. Each project, for example Project A, at the project level 400, may refer to one or more diagrams at the diagram level 402. Each diagram, such as Diagram 1, may then refer to one or more individual models at the model level 404.

Using this structure, multiple data mining projects can be associated with the same model repository 300, multiple data mining diagrams can be associated with the same project, and multiple models can be associated with the same diagram. A diagram represents the specifications for a number of data mining runs. There are typically groups of specifications, such as those related to the input data, the sampling technique, the data partitions, the data mining algorithm, the assessment methods, etc. More than one model may be associated with each of these diagrams. For example, although the specification may be the same for two models, there may be some attributes of the models that is different, such as when the model was run, that will result in a different model based on the same specification.

The first time that a request is received by the MRF 318A to export a model to the model repository 300 for a given project, a folder is created at the project level 400 for that project. The name of the project-level folder preferably identifies the current date and time and the last three characters of the requestor's user identification. For example if the current time was 19May2000:16:15:40 and the model export request was made by a person with the user identification "abc," then the name of the new project-level folder would be "2000_05_19_16_15_40_abc_project". Note, however, Note, however, that this is just one way to determine the name for the project-level folders, and other methods could certainly be utilized.

The first time that a diagram is encountered within a particular project, the diagram is given a sequential number, such as 000, 001, 002, 003, . . . , etc. For a given diagram, there could be multiple models. For example, suppose the input data is sales records. If the diagram is used once a month, there will be one model each month. If every month's model is worth saving, every month the model repository 300 receives an additional model that is associated with that diagram of that project. Within a given project and diagram, there is thus a one-to-many relationship between the diagram and its models (and between the project and its diagrams).

The name of the model's folder preferably identifies the diagram with which the model is associated (i.e., 000, 001, 002, 003, . . . , etc.) and also preferably identifies the model itself. Each model preferably has a model-identification that is unique within the diagram and unique within the project.

The coarse organization is provided by project-id, diagram-number, and model-id. Although these identifiers provide a useful way to identify a model, a typical search is likely to require a finer level of granularity. In order to provide this finer level of granularity, model attributes are used. Some attributes are automatically generated and associated with the models in the project folder 320 by the data mining application 318 or by MRF 318A.

Model descriptors are attributes that are associated with the models in the model repository 300, and also may be used in the main index 326, which can be searched by an end user in order to find and retrieve a particular model 323 or set of models. Descriptors can be assigned at the project level, the diagram level, and/or at the model level. Descriptors can be manually associated with the models in the project folder 20 by any of the system users 312, 314, 316. A descriptor preferably includes a variable-value pair, such as "site=Chicago" or "size=100,000". In these examples, site is a variable and Chicago is its value, and size is a variable and 100,000 is its value. The variable-value pairs may be manually specified by one of the system users 312, 314, 316 via a graphical user interface element, such as a pop-up window, notes tab, or other graphical data entry means, for selecting the particular project, diagram or model, and then for entering the appropriate descriptor.

As a result of these levels of attributes, a given model is identified by its own attributes, the attributes of its diagram, and the attributes of the diagram's project. By storing and organizing these model attributes in the various index structures 326, 327, 330 of the model repository 300, a much finer granularity for searching is provided.

FIG. 17 is a preferred data structure for a main-type index 326 that is part of the model repository 300 shown in FIG. 15. The main-type index 326 is structured as a table. The table includes a first column 340 in which the model is identified, and a plurality of other columns 342A, 342B, . . . , 342N, in which a plurality of attributes are specified. If the model's identification is not unique within the model repository, then an additional column is used to identify the project for which the model was generated. As noted above, each attribute is specified by a variable-value pair. The variables are listed in the first row of the table as Attribute A1, Attribute A2, Attribute A3, . . . , Attribute M1. The values for a given model are then set forth in the cells of the table for the row that is identified by the particular model's identification (and project identification, if necessary). The model names 344 preferably include an initial numerical identifier, such as "000" or "001", which identifies the diagram with which the particular model is associated.

In principle, the main-type index 326 could be constructed using the variables for every attribute associated with the models stored in the model repository 300. For practical reasons, however, the model repository administrator 314 preferably selects a subset of the attributes in order to construct the index, where the subset represents the attributes that end users 316 most likely would utilize in order to conduct a search. In addition, the model repository administrator 314 could decide to build more than one main-type index 326 for the model repository 300. Having more than one main index 326 would be useful if the search strategies employed by users can be grouped into several categories. In this situation, there could be one main-type index 326 per search category, with the attributes in that index being the ones that are useful in that category of search.

FIG. 18 is one of two preferred data structures 328A and 328B for a tree-type index 327 that is part of the model repository 300 shown in FIG. 15. Like the main-type index 326, the tree-type index 328A is organized as a table. The first column of the table 350 identifies the model 354. If the model's identification is not unique within the model repository, then an additional column is used to identify the project for which the model was generated. The remaining columns 352A, 352B, 352C, . . . , 352N set forth a plurality of attributes that are specific to the models associated with the tree-type index. These models were generated using a decision tree algorithm. For the tree-type index 328A, these special attributes are called the splitting variables. The intersection of a row and column in the tree-type index 328A is a cell that indicates whether or not (Yes or No, 1 or 0) a particular splitting variable is used in a particular model.

A model that results from a decision tree analysis identifies the variables that enable groups to be identified within the data. The records/observations within a group have similar behavior with respect to a target variable. For example, in a sales analysis, the target variable might be the one that contains the total amount of the sale. The variables that define the groups in the decision tree analysis are called predictor variables. The predictor variables that are most important to the analysis are called the splitting variables. It is these splitting variables that are listed in the tree-type index 327. The other predictor variables describe splits that are too trivial to matter to the outcome of the analysis.

The tree-type index 328A is preferably constructed using every splitting variable in the model repository 300. There are preferably two formats for the tree-type index 327. The format that is most comfortable for people to work with (such as, index 328A), if browsing the index, may or may not be the format that gives the best performance (such as, index 328B) to an application that may be automatically searching for and retrieving models from the model repository 300.

The first format 328A is shown in FIG. 18, as described above. The second format 328B is a table that has as many rows per model as the model has splitting variables. This second format 328B is shown in FIG. 19, and includes two columns, a first column 360 that identifies the model, and a second column 362 that identifies the splitting variable. If the model's identification is not unique within the model repository, then an additional column is used to identify the project for which the model was generated. In this second format 328B, if a model has four splitting variables, then the model has four rows in the table.

If the number of rows in the tree-type index 327 becomes too large for efficient searching, then an additional mini-index 330 can be provided in the model repository 300. The mini-index 330 contains a list of the names of all the splitting variables in all the models. In the mini-index 330, each splitting variable name appears only once. In the tree-type index 327, each splitting variable name may appear many times. Thus, the mini-index 330 is an index to the tree-type index 327. If the mini-index 330 is searched first, and the splitting variable that is needed is not there, then there is no need to search the tree-type index 327, thus making the search process more efficient.

Figure 20:
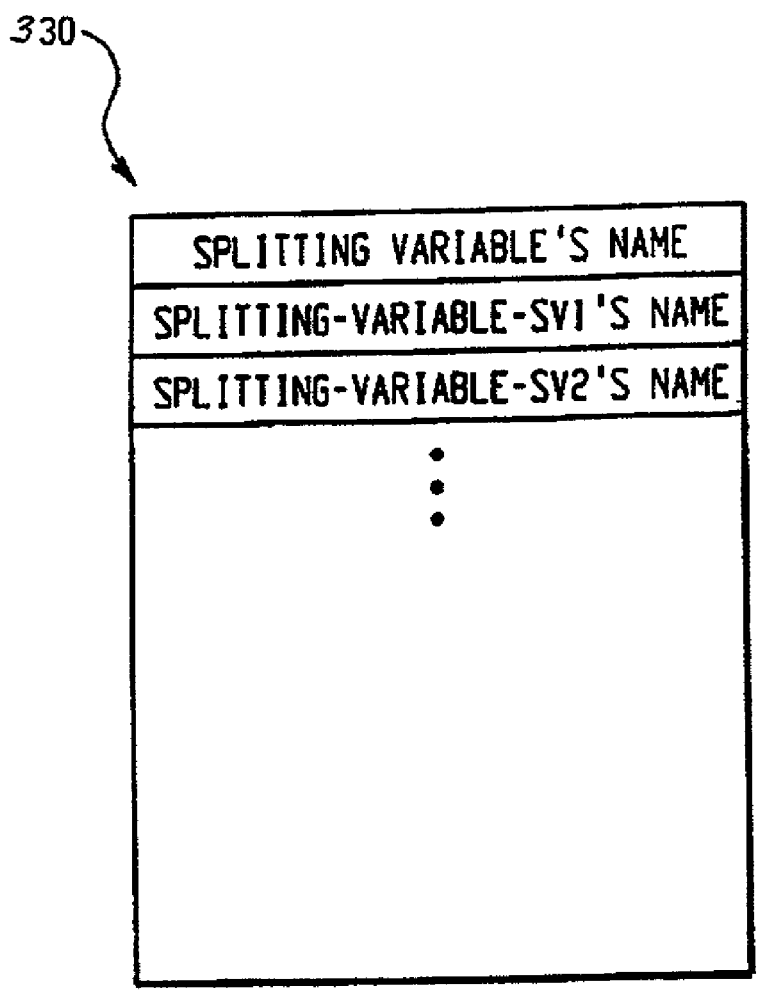
FIG. 20 is a block diagram depicting a data structure for a mini-index that is part of a model repository.

FIG. 20 is a preferred data structure for a mini-index 330 that is part of the model repository 300 shown in FIG. 15. The mini-index is a table. The table includes one column, which identifies the name of a splitting variable that is in at least one of the models in the model repository.

Figure 21:
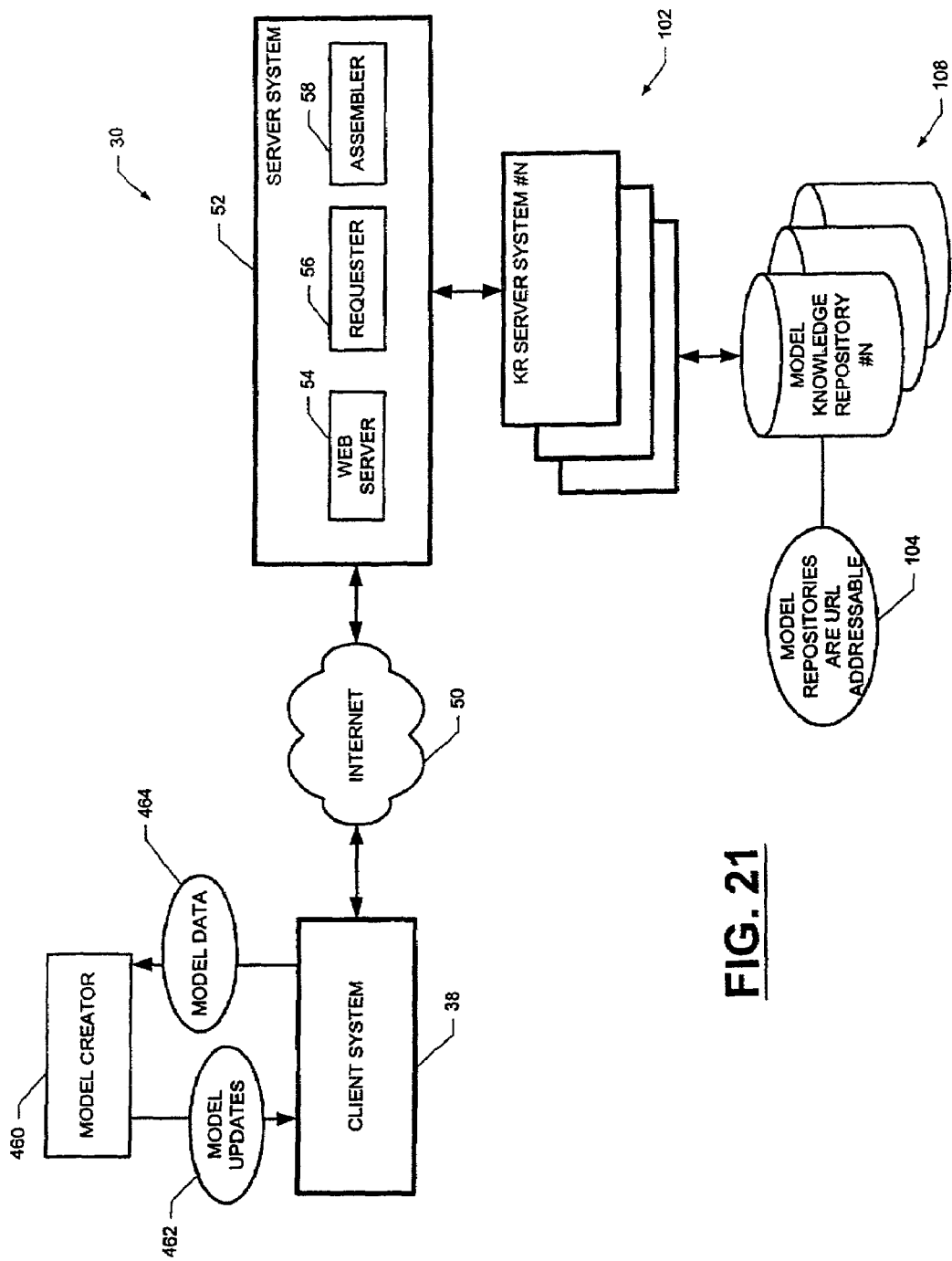
FIG. 21 is a system block diagram depicting computer-related components that allow model designers to access remote knowledge repositories.

The embodiments described above are examples of structures, systems and methods having elements corresponding to the elements of the present invention recited in the claims. This written description enables those skilled in the art to make and use embodiments having alternative elements that likewise correspond to the elements of the invention recited in the claims. The intended scope of the invention may thus include other structures, systems or methods that do not differ from the literal language of the claims, and may further include other structures, systems or methods with insubstantial differences from the literal language of the claims. As an illustration, FIG. 21 depicts the knowledge repository interface system being used by a model creator 460. The model creator 460 constructs models and stores them in the knowledge repositories 108. The model creator 460 invokes the knowledge repository design-related APIs. The design-related APIs allow the model creator 460 to create new models in the knowledge repositories 108 and hone the models by conducting experiments with them. In this way, the model designer 460 can interact in a design capacity although remotely located from where the models are located.

It is further noted that different configurations of the knowledge repository interface system may result due to security reasons. The remote server system 52 may be interposed between the client system 38 and the knowledge repository server systems 102 as a security buffer. Different client systems and their users may have different authorizations to the knowledge repositories. One user on a client system may have access to all knowledge repositories, while another user on the same client system may have only read access (i.e., no edit, delete or write access) to a limited portion of information within one knowledge repository. Security authorization may also restrict what knowledge repository APIs are available to an end user.

The invention claimed is:

1. A computer-implemented knowledge repository data interface system for use by client applications, comprising:
   a plurality of knowledge repositories that contain analytical models;
   a request handling module having a data pathway to the knowledge repositories and to the client applications, said request handling module receiving a request regarding the models from a client application over a network,
   wherein structure of the request contains content identification tags associated with contents of the request, said request handling module parsing the contents of the requests by the content identification tags;
   a plurality of knowledge repository application programming interfaces (APIs) that retrieve data about the models from the knowledge repositories; and
   API dispatcher modules associated with the knowledge repositories that select knowledge repository APIs based upon the parsed request contents,
   wherein the selected knowledge repository APIs are used to retrieve data about the models from the knowledge repositories in response to the client application's request.

2. The system of claim 1 wherein the client application uses an Internet web address associated with the request handling module to transmit the request.

3. The system of claim 2 wherein the request handling module uses Internet web addresses associated with the knowledge repositories to send at least a portion of the parsed request contents to the API dispatcher modules.

4. The system of claim 1 wherein an Internet web address is associated with a first knowledge repository, wherein the client application uses the first knowledge repository's Internet web address to send a request to the API dispatcher module that is associated with the first knowledge repository.

5. The system of claim 4 wherein the first knowledge repository's API dispatcher module selects at least one knowledge repository API to retrieve model data from the first knowledge repository based upon contents of the request.

6. The system of claim 5 wherein at least one of the knowledge repository APIs provides upon request by the client application the Internet web address of the first knowledge repository.

7. The system of claim 1 wherein at least one of the API dispatcher modules selects a plurality of knowledge repository APIs in order to retrieve model data from its associated knowledge repository for servicing the client application's request.

8. The system of claim 1 wherein the request handling module has data access to an extensible markup language parser in order to generate the parsed request contents.

9. The system of claim 1 wherein the request handling module determines which of the knowledge repositories contain model data responsive to the client application's request.

10. The system of claim 1 wherein the knowledge repository APIs retrieve statistical model data from the knowledge repositories.

11. The system of claim 1 further comprising:
an assembler module that processes model search results from execution of the knowledge repository APIs upon the plurality of knowledge repositories.

12. The system of claim 11 wherein processing by the assembler module includes removing redundant model search results.

13. The system of claim 11 wherein the assembler module waits until the knowledge repository APIs have provided their respective model search results before transmission of the model search results to the requesting client application over the network occurs.

14. The system of claim 13 wherein the assembler module converts the model search results into a tagged format.

15. The system of claim 14 wherein the tagged format is an extensible markup language (XML) tagged format.

16. The system of claim 14 wherein the tagged format is a hypertext markup language (HTML) tagged format.

17. The system of claim 1 wherein the models include decision tree models.

18. The system of claim 1 wherein the models include neural network models.

19. The system of claim 1 wherein the models include fuzzy logic models.

20. The system of claim 1 wherein the models include statistical models.

21. The system of claim 1 wherein the network is an Internet network.

22. The system of claim 1 further comprising:
a model index that contains metadata about the model data stored in a knowledge repository, wherein at least one of the knowledge repository APIs searches the model index to formulate model search results to be sent to the requesting client application.

23. The system of claim 1 further comprising:
a project model index that contains project metadata about the model data stored in a knowledge repository, wherein at least one of the knowledge repository APIs searches the project metadata to formulate model search results to be sent to the requesting client application.

24. The system of claim 1 wherein the structure of the request is in an extensible markup language (XML) tagged format.

25. The system of claim 1 wherein the structure of the request is in a hypertext markup language (HTML) tagged format.

26. The system of claim 1 wherein the context of the requests include model search criteria for limiting what model data is retrieved from the knowledge repositories.

27. The system of claim 1 wherein an end user provides data for the client application to formulate the request.

28. The system of claim 27 wherein the end user is a human end user who provides the data to formulate the request.

29. The system of claim 27 wherein the end user is a business analyst who provides the data to formulate the request.

30. The system of claim 27 wherein the end user is a model creator who provides model design update data that serves as a request to the request handling module for execution of a knowledge repository design API which updates model data in at least one of the knowledge repositories.

31. The system of claim 27 wherein the end user provides model execution data that serves as a request to the request handling module for execution of a knowledge repository design API which executes a model in at least one of the knowledge repositories.

32. The system of claim 27 wherein the end user is a substantially automated computer application that provides data for the client application to formulate the request.

33. The system of claim 1 wherein the content identification tags are analytical model specific tags that contain analytical model specific information.

34. A computer-implemented knowledge repository data interface method for use by client applications to access remote knowledge repositories, said knowledge repositories containing analytical models, comprising:
receiving a request regarding the models from a client application over a network, wherein structure of the request contains content identification tags associated with contents of the request, said request handling module parsing the contents of the requests by the content identification tags;
selecting knowledge repository application programming interfaces (APIs) based upon the parsed request contents;
retrieving data about the models from the knowledge repositories using the selected knowledge repository APIs; and
providing the retrieved model data to the requesting client application.

35. The method of claim 34 further comprising:
receiving a first request from the client application over the network for a list of knowledge repository API structures; and
providing the list of knowledge repository API structures so that the client application may construct a first model function call based upon the provided knowledge repository API structures.

* * * * *